(12) United States Patent
Rosnow et al.

(10) Patent No.: US 7,051,036 B2
(45) Date of Patent: May 23, 2006

(54) COMPUTER-IMPLEMENTED SYSTEM AND METHOD FOR PROJECT DEVELOPMENT

(75) Inventors: Jeffrey J. Rosnow, Oregon, WI (US); Lawrence G. McManis, Jr., Stoughton, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 482 days.

(21) Appl. No.: 09/998,892

(22) Filed: Dec. 3, 2001

(65) Prior Publication Data

US 2003/0106039 A1 Jun. 5, 2003

(51) Int. Cl.
*G06F 17/00* (2006.01)
*G06F 17/30* (2006.01)
*G06F 9/44* (2006.01)

(52) U.S. Cl. .................. 707/102; 707/104.1; 707/3; 717/101

(58) Field of Classification Search .............. 705/1, 705/7, 10, 205; 707/102, 104.1, 3; 709/205; 717/101

See application file for complete search history.

(56) References Cited

U.S. PATENT DOCUMENTS

| | | | |
|---|---|---|---|
| 3,736,409 A | 5/1973 | Boyan | |
| 5,172,313 A | 12/1992 | Schumacher | |
| 5,208,765 A | 5/1993 | Turnball | |
| 5,311,438 A | 5/1994 | Sellers et al. | |
| 5,433,546 A | 7/1995 | Kershaw | |
| 5,506,783 A | 4/1996 | Tanaka et al. | |
| 5,524,077 A | 6/1996 | Faaland et al. | |
| 5,548,506 A | 8/1996 | Srinivasan | |
| 5,557,515 A | 9/1996 | Abbruzzese et al. | |
| 5,581,691 A | 12/1996 | Hsu et al. | |
| 5,596,502 A | 1/1997 | Koski et al. | |
| 5,655,118 A | 8/1997 | Heindel et al. | |
| 5,742,768 A * | 4/1998 | Gennaro et al. ............. 1/1 |
| 5,765,137 A | 6/1998 | Lee | |
| 5,765,140 A | 6/1998 | Knudson et al. | |
| 5,767,848 A | 6/1998 | Matsuzaki et al. | |
| 5,815,638 A * | 9/1998 | Lenz et al. ............. 706/15 |
| 5,848,271 A | 12/1998 | Caruso et al. | |
| 5,864,480 A | 1/1999 | Ladd | |
| 5,893,074 A | 4/1999 | Hughes et al. | |
| 5,983,194 A | 11/1999 | Hogge et al. | |
| 5,999,911 A | 12/1999 | Berg et al. | |
| 6,023,702 A | 2/2000 | Leisten et al. | |
| 6,026,365 A | 2/2000 | Hayashi | |

(Continued)

OTHER PUBLICATIONS

Oracle® Project Resource Management, Implementation and Administration Guide, Release 1.0, May, 2001 (previously provided).*

(Continued)

*Primary Examiner*—Greta Robinson
*Assistant Examiner*—Kuen S. Lu
(74) *Attorney, Agent, or Firm*—Fitch, Even, Tabin & Flannery

(57) ABSTRACT

The present invention generally relates to an inventive automated system, and method for its use, including a computer having a computer program defining three development phases including project proposal development, business proposition development, and implementation for market introduction. The project proposal development phase includes a unique idea verification feature by automated reference to an internal knowledge repository and database. The computer is coupled for intercommunication to a plurality of stations or clients from which respective authorized users each have a browser-based interface with the computer.

43 Claims, 24 Drawing Sheets

U.S. PATENT DOCUMENTS

| | | | |
|---|---|---|---|
| 6,038,517 | A | 3/2000 | Dobbins et al. |
| 6,044,354 | A | 3/2000 | Asplen, Jr. |
| 6,058,395 | A | 5/2000 | Buzaglo et al. |
| 6,064,977 | A | 5/2000 | Haverstock et al. |
| 6,073,109 | A | 6/2000 | Flores et al. |
| 6,138,104 | A | 10/2000 | Marchak et al. |
| 6,144,955 | A | 11/2000 | Tsuiki et al. |
| 6,170,002 | B1 | 1/2001 | Ouchi |
| 6,212,549 | B1* | 4/2001 | Page et al. .................. 709/205 |
| 6,718,535 | B1* | 4/2004 | Underwood ................ 717/101 |
| 2002/0040469 | A1* | 4/2002 | Pramberger ................ 717/121 |
| 2002/0065671 | A1* | 5/2002 | Goerz et al. .................... 705/1 |
| 2003/0004766 | A1* | 1/2003 | Sandoval et al. ............... 705/7 |
| 2003/0101089 | A1* | 5/2003 | Chappel et al. ............... 705/10 |
| 2004/0031030 | A1* | 2/2004 | Kidder et al. ................ 717/172 |

OTHER PUBLICATIONS

Product Brochure, Lotus Workflow 3.0 release, "Workflow Automation for the Enterprise", 2 pages, May 2001.

Planview Inc., "Workforce & Program Management", a printout of: http://www.planview.com/entry.html, 1 page, Jan. 24, 2001.

Team Project, a printout of: http://www.workflowtech.com/workflow/tpsales2.nsf?OpenDatabase, 1 page, Jan. 24, 2001.

Microsoft Project 2000, "Program Management for Business Results", a printout of: http://www.microsoft.com/office/project/default.htm, 1 page, Jan. 24, 2001.

KIDASA Software, "Professional 2000 Milestones™", a printout of: http://www.kidasa.com/, 1 page, Jan. 24, 2001.

"Stage-Gate® new product development process", a printout of: http://www.stage-gate.dk/stage-gate.html, 1 page, Jan. 24, 2001.

PRTM, "Web-Enabled Product Development", a printout of: http://prtm.com/services/one?service_=46, 1 page, Jan. 24, 2001.

"Ide's Integrated Solutions for Development Chain Management", a printout of: http://www.ide.com/ide.asp?id=1, 1 page, Jan. 24, 2001.

* cited by examiner

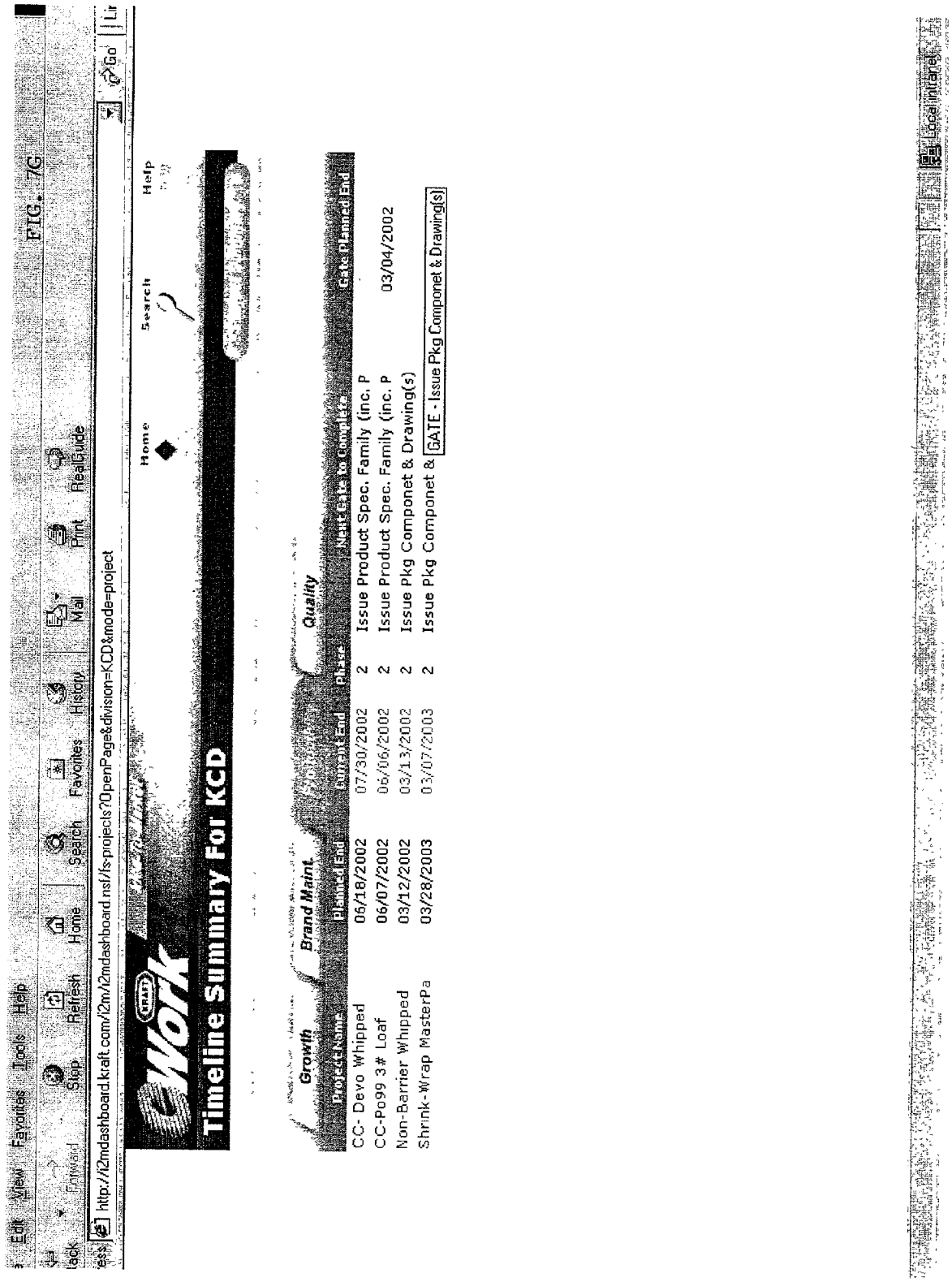

COMPUTER-IMPLEMENTED SYSTEM AND METHOD FOR PROJECT DEVELOPMENT

FIELD OF THE INVENTION

The present invention generally relates to computer-implemented project development systems and their methods of use.

BACKGROUND OF THE INVENTION

Automated systems have been generally described in the past for planning, scheduling, task managing, or monitoring, and the like, for purposes of managing a project. Many of these systems concentrate on particular aspects of the development of a product or service, such as the associated financial or manufacturing aspects thereof, but do not fully integrate all the varied tasks of the process. In reality, the development and evolution within a business enterprise of a new idea for a new product or service, or a change to an existing product or service, all the way from its genesis through actual market introduction and acceptance, can require numerous, even hundreds or thousands, of tasks and subtasks. In addition, the development of a new product often involves numerous tasks, inputs, interactions, and/or reviews for approval requiring the involvement of a wide variety of personnel within a business such as from among marketing, manufacturing, engineering, management departments, and so forth. Also, the completion of many tasks and subtasks is contingent upon information being available for use that is generated in other separate tasks. The ability to share, and have information ready for sharing or consideration when needed, is critical to an efficient outcome. This represents a complex process. Consequently, there exists a need for automated systems that can efficiently manage the entire idea-to-market product development processes within a business in a way that reduces the development cycle time as much as possible.

U.S. Pat. No. 6,044,354 to Asplen, Jr. describe a product planning system with gates using a server for storing centralized data accessible by remote stations via communication lines, which could be telecommunication lines for internet and e-mail capability. Among other things, a need also still exists for an automated computer system making it possible to permit automated screening and comparing of newly proposed ideas for projects relative to prior or ongoing projects and their results, if any, of the same business. U.S. Pat. No. 5,208,765 to Turnbull, U.S. Pat. No. 5,311,438 Sellers et al., and U.S. Pat. No. 5,767,848 to Matsuzaki et al., describe network-based project management/workflow systems with gates. U.S. Pat. No. 6,170,002 to Ouchi, U.S. Pat. No. 6,026,365 to Hayashi, U.S. Pat. No. 6,023,702 to Leisten et al., and U.S. Pat. No. 5,893,074 to Hughes et al., describe web-enabled project management workflow method and systems. U.S. Pat. No. 5,864,480 to Ladd describes a product development method and system with gates. U.S. Pat. No. 6,144,955 to Tsuiki et al., U.S. Pat. No. 6,073,109 to Flores et al., U.S. Pat. No. 5,999,911 to Berg et al., U.S. Pat. No. 5,848,271 to Caruso et al., U.S. Pat. No. 5,655,118 to Heindel et al., U.S. Pat. No. 5,581,691 to Hsu et al., and U.S. Pat. No. 5,548,506 to Srinivasan, describe network-based project management workflow systems. U.S. Pat. No. 6,138,104 to Marchak et al., U.S. Pat. No. 6,058,395 to Buzaglo et al., U.S. Pat. No. 6,038,517 to Dobbins et al., and U.S. Pat. No. 5,765,137 to Lee et al., describe product development and project communications tools.

As can be appreciated, a need exists for a dynamic and facile automated system for the development of an idea for a new product or change to an existing product through launch which makes it possible, among other things, to consolidate and capture all of the various best practices within an enterprise or other relatively large suborganizational unit thereof into a single standardized automated workflow structure and approach. Automated systems permitting enhanced document and file management are also needed. There also is a need for an automated system for idea development which can filter newly proposed ideas in a more efficient and authentically automated manner. Also needed are idea-to-market development systems which are more flexible and customizable to permit changes to be made during the life cycle of a project. A tool for enhancing team collaboration also is needed, as well as integrated e-mail functionality to permit electronic interactions between task members as well as enable electronic transmission and retrieval of task-related documentation by task members and reviewers.

SUMMARY OF THE INVENTION

The present invention fulfills the above needs and other objectives by a unique computer-implemented system and method for evaluating, planning, and implementing a project from conceptualization to market introduction.

In one embodiment, the inventive automated system includes a computer having a computer program defining at least three development phases including project proposal development having a unique idea verification feature by automated reference to an internal knowledge repository and database, business proposition development, and implementation for market introduction. The computer is coupled for inter-communication to a plurality of stations or clients from which respective authorized users each have a browser-based interface with the computer.

The entire idea to market development scheme for an idea is managed and set up as a project in an automated manner. When an idea for a new product, change to an existing product, and so forth, is identified within an organization, a project is initiated on the automated system of this invention. A varied number of development processes are performed for a given project, depending upon the scope of the project. The processes are a mixture of tasks and documents that need to be completed in order for the idea development process itself to be completed. The project planning system of this invention provides for task management by allowing project leaders, project team members, and management to monitor and track the progress of projects via browser-based interfaces with a computerized managing tool. Tasks are assigned to personnel using the system computer by project leaders or other designated administrators, during development of a project. The system computer prompts persons assigned to tasks for receipt of task completion information and/or required documentation, or prompts decision-makers to enter an approval or disapproval before proceeding further with the project at predetermined gates of the development process. The system also integrates electronic messaging (i.e., e-mail) functionality to permit electronic interactions between task owners on a given development project for scheduling and notifications. The system additionally supports electronic retrieval and transmission of task related documentation to and from task members and reviewers via the web browser.

Not all projects ultimately make it to launch as the inventive system includes gates that must be passed through along the way. For example, the process includes tests and checks for market acceptance, technical/production feasibility, resource availability, and so forth, and other important predetermined criteria at appropriate junctures along the development cycle of a given project. Decision makers are prompted to enter yes or no decisions at the predetermined gates, which are done electronically and automatically through the decision maker's browser-enable interface with the automated system. If an assigned decision-maker rejects a project at a given gate at some time before reaching product launch, by making such an entry in the system when prompted, the files generated to date for that project are stored on the system under its previously assigned project identifier. In this way, electronically searchable and identifiable histories are preserved on the system of all previous projects, as well as newly submitted and on-going projects. In this way, an empirical knowledge database is created, maintained, and accessible on the system encompassing all new project vetting and implementation activities. Among other things, this feature helps to prevent duplications, and helps the organization to identify best practices and bottlenecks in the process.

The project planning system also embodies development rules that lead to more efficient and versatile workflow management capabilities. It provides for dynamic and flexible timeline creation and management. Assignment of task ownership and task durations also is flexible. If major and minor process tasks change, the project planning system can be dynamically adjusted to reflect the new changes for new projects. Moreover, the inventive system is versatile and can be applied to different categories of projects including, for example, new products, existing product quality enhancements, productivity (e.g., cost saving measures), and brand maintenance (e.g., enhancing or maintaining product image). The system also is flexible enough to permit addition of a customizable task. Some projects will require more tasks and documents than others, and the inventive system have the flexibility to accommodate these varied needs from project to project. The system permits management of multiple concurrent options. In addition, the system has the capability to identify and manage non-mandatory tasks as options. The invention captures and accelerates ideas from thought to viable new market offerings so as to create additional revenue and concomitantly reduce cost and increase internal efficiency.

Team members and decision makers for a project can access these and other functionalities via web browsers on computer access devices and through an on-screen interface providing viewable pages used for project tracking and monitoring, data entry, document submission and downloading, and e-mail functions, and so forth.

The project development system also offers security measures that differentiate between external clients, e.g., suppliers, vendors, and internal clients, e.g., employee project team members, to control the access of the client to the system resources after the system sorts the users access by the information entered at an authentification screen. The system also can use cookies to develop a user profile of respective clients. In another aspect, the graphical user interface provided for this system can provide contextual help, such as best practice tips and so forth, as a "pop-up" or a "scroll in" that appears on the user's display screen when the user moves the cursor arrow over and rests it on a button or heading in the screen. The project development system also has built-in e-mail functionality capability. Using internet e-mail, e-mail documents can be separately sent or received without the user needing to back out of the screen being viewed. E-mailed documents can be sent as an attachment or the recipient can be given a URL to automatically go retrieve it when the attachment is clicked on. When sending e-mail, a team tab feature is also provided permitting a user to check a box next to a name(s) of desired team member recipients without having to scroll out of a screen to send the e-mail. The inventive system also has enhanced report feature for report viewing and printing functionalities, such that specific project timelines, GANTT charts, comments reports, issue reports, and so forth, are printable browser-based documents. A senior management dashboard feature provides customized display screens for senior management providing overview information for projects underway in and across divisions, including summary information such as on financials, project names and planned and current ends, and specific location of the project along the process flow. Again, the authentification and security functions of the system govern which users will be permitted access to such specialized screens.

In one aspect of the present invention, every time a task owner inputs task data, such as a task completion, into the system, agents flow throughout the system and updates, project-wise, the status of the project in real-time. In this way, concurrent, parallel project management is attained over the project development.

BRIEF DESCRIPTION OF THE DRAWINGS

Other features, objects, and advantages of the present invention will become apparent from the following detail description of preferred embodiments of the invention with reference to the drawings, in which:

FIG. 7G is a diagrammatic view of an embodiment of the graphical user interface of the present invention showing the screen display of a displayed window on a senior manager's graphical user interface in "dashboard" summary format for projects being managed by the system of FIG. 4.

Figure 1:
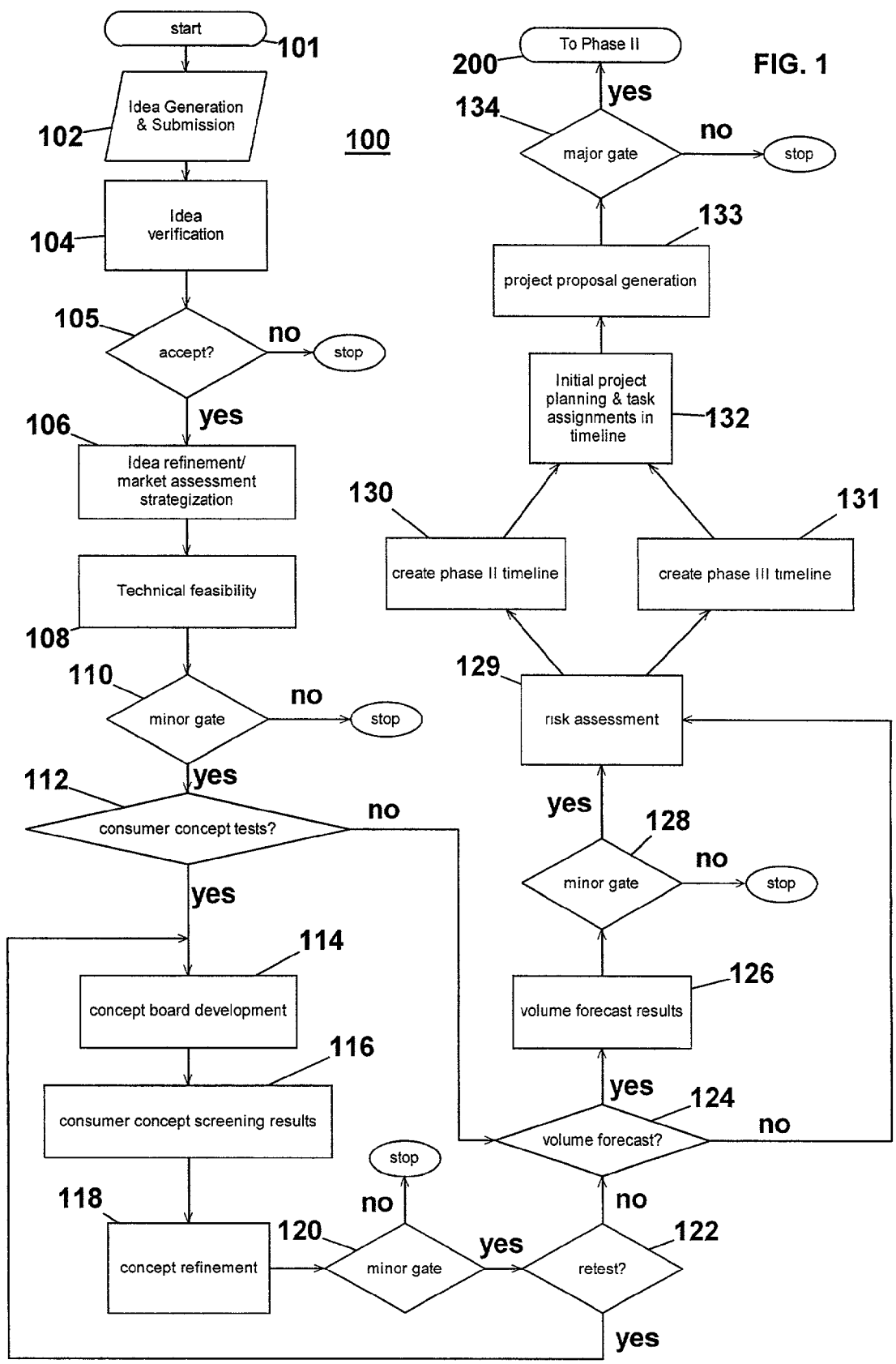
FIG. 1 is a flow chart of a first phase, Phase I, of the inventive method for automated workflow management.

Skilled artisans will appreciate that elements in the figures are illustrated for simplicity and clarity and have not necessarily been drawn to scale. For example, the dimensions of some of the features shown in the figures may be enlarged relative to other elements to facilitate the discussion herein of the embodiments of the invention. Also, features in the various figures identified with the same reference numerals represent like features, unless indicated otherwise.

DETAILED DESCRIPTION OF THE INVENTION

The present invention comprises a web-based enterprise-wide project management method to enhance the idea-to-market process, which has three development phases, and incorporates workflow tracking. A "project" is generated when an idea for a new product or service or a change to an existing product or service is generated within the organization and submitted to the automated idea verification and implementation system of the present invention. This project, depending on its type, will have a variable number of tasks and documents that are completed as the project progresses. Project data, its documents and tasks are managed, contained, and can be monitored as the project progresses within the inventive system.

Figure 2:
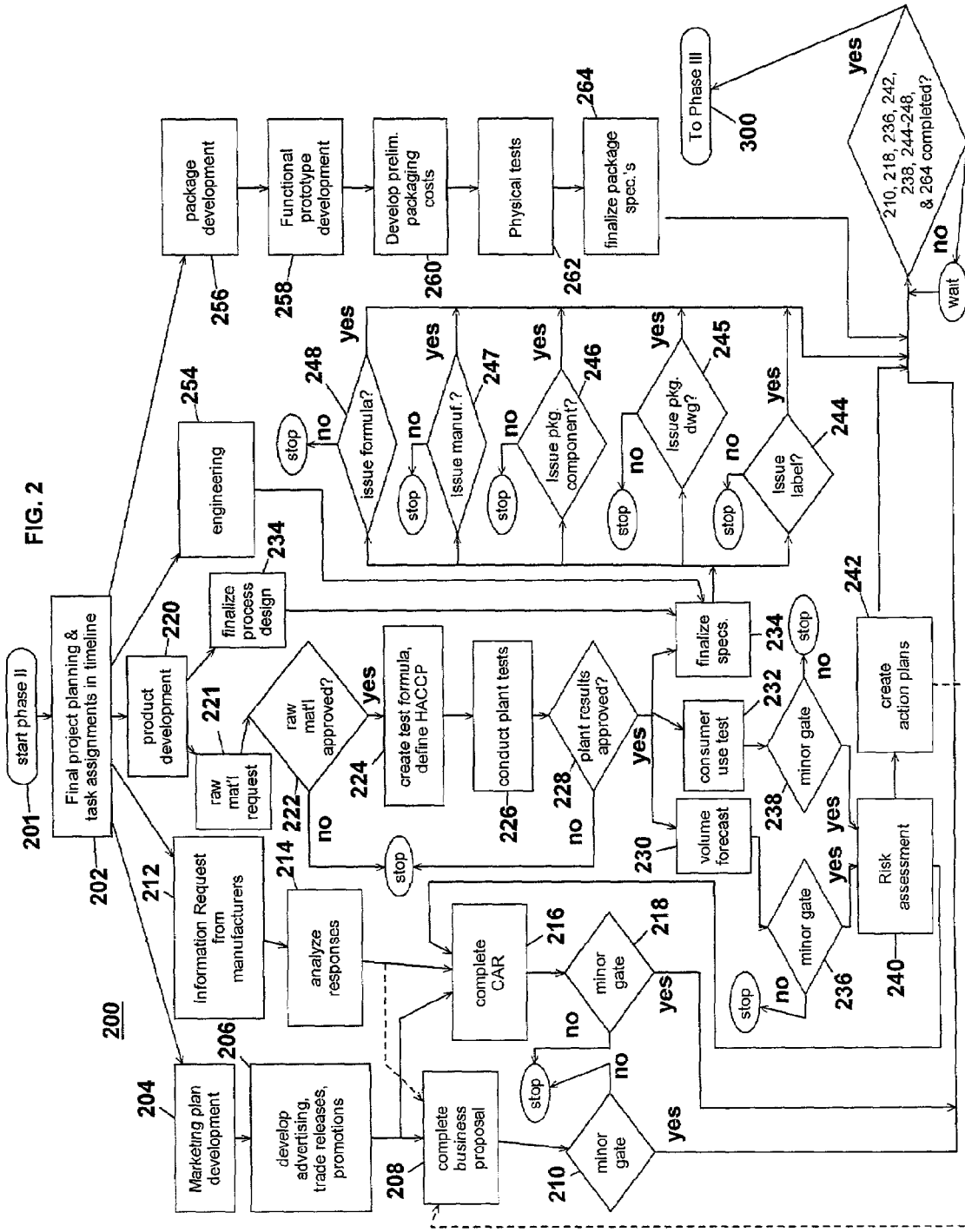
FIG. 2 is a flow chart of a second phase, Phase II, of the inventive method.
Figure 3:
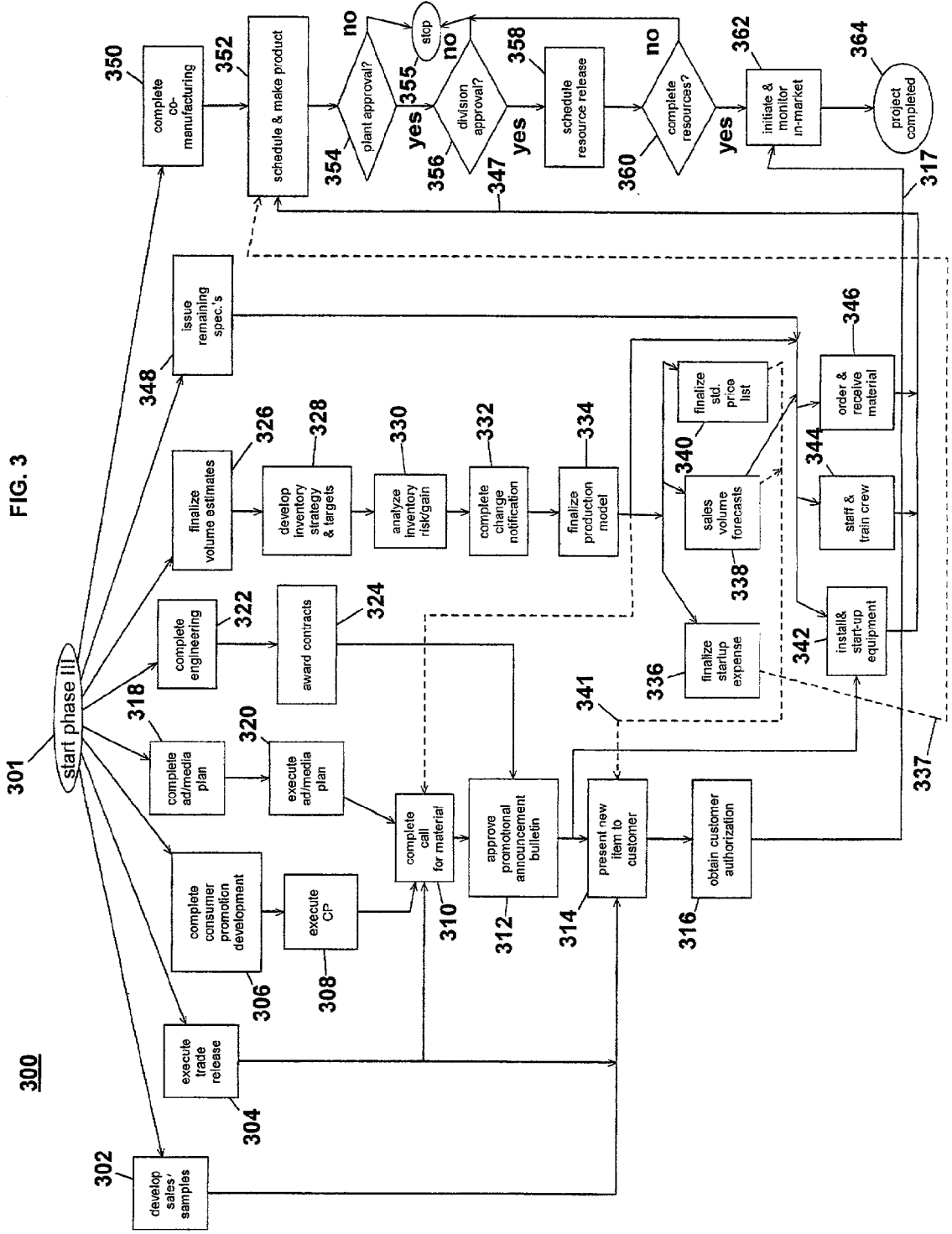
FIG. 3 is a flow chart of a third phase, Phase III, of the inventive method.

FIGS. 1–3, discussed in greater detail below, illustrate a product development method according to an aspect of the present invention including three development phases in which each phase is completed by implementing a cascade of tasks.

To manage and implement the method of FIGS. 1–3, a computer-based project planning system 400 is used. The project planning system 400 used to implement the project development method generally includes a computer 405 comprising a web server 401 coupled for inter-communication with a plurality of stations or clients 422, 424, and 426, and so on, such as by way of two-way communication lines 425. The "computer" terminology is used collectively here to embrace all of the web server 401 as well as the associated databases 406 and 410, integrator 404, directory 402, and subsystem 408. The functionalities of these various subsystems of the computer are described in greater detail below. Importantly, user stations 422, 424 and 426 are equipped with a web browser. For example, stations 422, 424, and 426 can be personal computers operable for running application programs and including browser software (e.g., Microsoft Internet Explorer) residing thereon, and having a monitor (e.g., a VDT or LCD) for displaying computer screens, and a keyboard, touch pad, voice recognition capability, or other interface permitting the user to access and provide input to computer system 410 from the stations. For example, the stations could be personal computers including a CPU, such as a desktop computer or a laptop computer. The stations alternatively could be Internet terminals or a personal digital assistant that can communicate with a computer via web server 401.

The inventive project planning system 400 also stores project-related documents, such as WORD documents, Powerpoint presentations, Excel spreadsheets, and so forth, that can be filed, accessed and downloaded by users. Thus, as another predicate to using the project planning system 400, participating users also will have the appropriate software installed on their work stations to prepare, read, and/or edit those types of documents, as applicable or needed. That is, to participate, user systems may have local copies of document handling software and browser components such as plug-ins from ITM, measuring Tool and Eye Dropper plug-ins from Pit Stop, Flash plug-ins from Macromedia and Adobe Acrobat Exchange. Throughout the product development workflow cycle participants can enter, review, approve forms as applicable. Workflow events trigger e-mail notifications to pertinent parties. These e-mail notifications contain uniform resource locator (URL) pointers to the appropriate documents within the system. Form processing may be done at the server or portal 401 level using script agents, e.g., the Lotus Script agents from Lotus Corporation. Field validation and data transfer may be done using Java script, for example, and applets may be included for interface presentation such as view and action bars. The system 400 may be accessible from inside a local area network or over an intranet, for example, by using a locally recognized URL, e.g., <httD://kraftework.kraft.com>or externally, over the Internet selecting an externally accessible URL, e.g., <httD://www. kraftework.com>.

As noted, users of the inventive project planning system have a working browser residing on their computer that can access the portal or web server (401), such as Microsoft's Internet Explorer or Netscape Navigator. To access the home page of the planning system at portal 401, a user enters via a provided desktop icon, which submits a uniform resource locator (URL) which the business has assigned to the project planning system via a browser residing on the client and the URL is sent to the web server 401 using HTTP.

User security may be included such that participants must be authenticated prior to use with Lotus Notes Security, for example, from Lotus Corporation. Sessions may be enabled, using basic Hyper Text Transfer Protocol (HTTP) with enhanced security using cookies, for example. Names and roles of system participants are stored in tables and as views and may be transferred for authentication. Also, user identification (Ids) and password information may be generated and communicated to the appropriate user using e-mail. Only authorized individuals are allowed access to individual documents.

When the project planning system 400 is entered by an authorized user who provides an appropriate name and password or other unique user security information, the program initially presents to a user at a station a main menu screen presenting various selection options to the user. That is, the server 401 responds by sending the system home (portal) page to the display unit being used by the user. Authorized users include internal users, such as employees of the business or enterprise who are members of the team assigned to develop the concept to launch, as well as authorized external users, such as vendors, suppliers, outside contractors, and manufacturers and the like used to carry out certain tasks in the workflow. The authorized external users, also will use browser-enabled access devices including a display screen. The system 400 different users to be given and granted different levels of access into the system 400. For example, in step 222, discussed in more detail below, potential outside suppliers of a raw material to be used in the development of a new product may be given sufficient access to the system 400 to be prompted to submit a material information sheet within a given timeline as a task, but not be granted in other access to the various division databases of system 400.

The portal 401 has links that will either perform actions or deliver pages to the user. These links are connected by clicking-on buttons displayed on a display screen associated with the user's computer or terminal using either a conventional computer mouse or via a keyboard. This portal concept provides for scalability by having one central starting point, portal 401 that can intelligently direct users to the appropriate areas to allow for completion of tasks. The portal 401 can be updated to include new divisions within a business organization. Also, the portal concept provides flexible user customizing.

Figure 6:
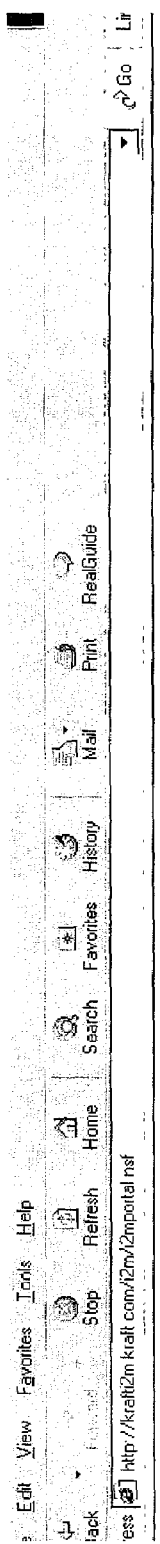
FIG. 6 is a diagrammatic view of an embodiment of the graphical user interface of the present invention showing the screen display of an authentification screen displayed to a user of the system of FIG. 4.
Figure 6:

Upon authenticating a user, such as via user name and password information, e.g., see FIG. 6, the portal 401 can permit users to perform project development activities, such as the following: novelty or reference searching in prior or current projects, such as via key word or via organizational unit; perform searches for project related documents; view and manage a project; access an area that lists that user's tasks and the status of those tasks; and view current and closed projects for, their division- Other project development activities that can be automatically performed via the system 400 are detailed in the process example illustrated in connection with FIGS. 1–3, and discussed later herein;

At a main menu screen level, the user can enter the system 400 via portal 401 through key stroke identification or clicking-on a listed project of interest. This action on the browser-based system retrieves screens applicable to the project selected. For example, a screen pops-up on the user's computer display, when a specific project identifier has been entered by an authorized user, including information on the project title, the project leader, the project members roster, information on task management (e.g., bold type matters await completion), a project resource management interface, a document library and project document management window (e.g., bold type matters await completion); access to project e-mail via Microsoft Outlook and the like, and a timeline manager indicating which process tasks have been completed and which ones have not.

Figure 7A:
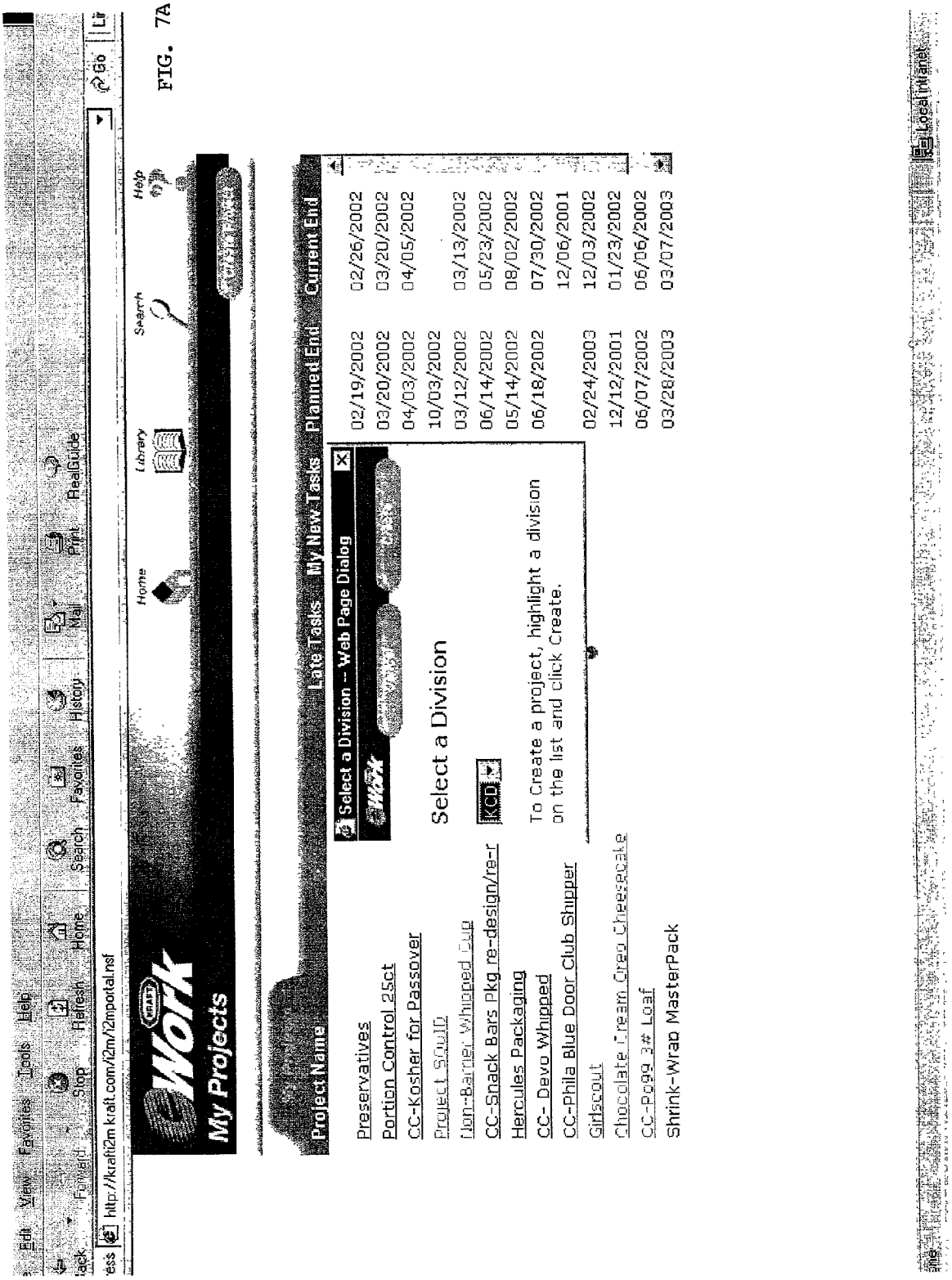
FIG. 7A is a diagrammatic view of an embodiment of the graphical user interface of the present invention showing the screen display of a user's project list of projects being managed by the system of FIG. 4.

As shown in FIG. 7A, a button also is included on the menu for creating new projects, if desired. When that button is clicked-on, the user or evaluator is linked to a page providing electronic access to a searchable database of past and present projects within the enterprise to permit filtering for idea novelty, and access to a form for electronically submitting a new idea for consideration by an assigned review team for the subject matter of interest.

Also, the displayed menu indicates, such as by color coding or font type or some other visually recognizable method, the completion of each task as each task of an ongoing project is completed and information to that effect is received. The team members and project leader will be identified at the displayed page or linked to information in that respect. Also, project e-mail can be retrieved and sent through the opening web page by clicking on buttons and items indicated on the displayed menu for those purposes. Team members, project leaders or senior management personnel, as applicable, will have electronic access to the task information and relevant technical, business or resource information and documents needed on a need to know basis. The user's unique identifier will be recognized by the system and dictate the level and scope of the user's access to the project documentation. Approval for the project to move forward at various minor and major gates of the process flow discussed herein are entered electronically by the assigned reviewer(s). Also, authorized users can download and display information on all projects within a given division of the enterprise including timeline and status information for each project listed. In one exemplification, for each task in the development of a project, the automated system will list process tasks and their respective subsumed activities to be completed, the task due date (including information on the originally planned and current due dates), the activity owner from an organizational standpoint, the activity owner from a personnel standpoint, the document, if any, and its name to be generated to complete the task, the origin of the document template, if any, the document type, and location of storage of the document within the system.

Figure 4:
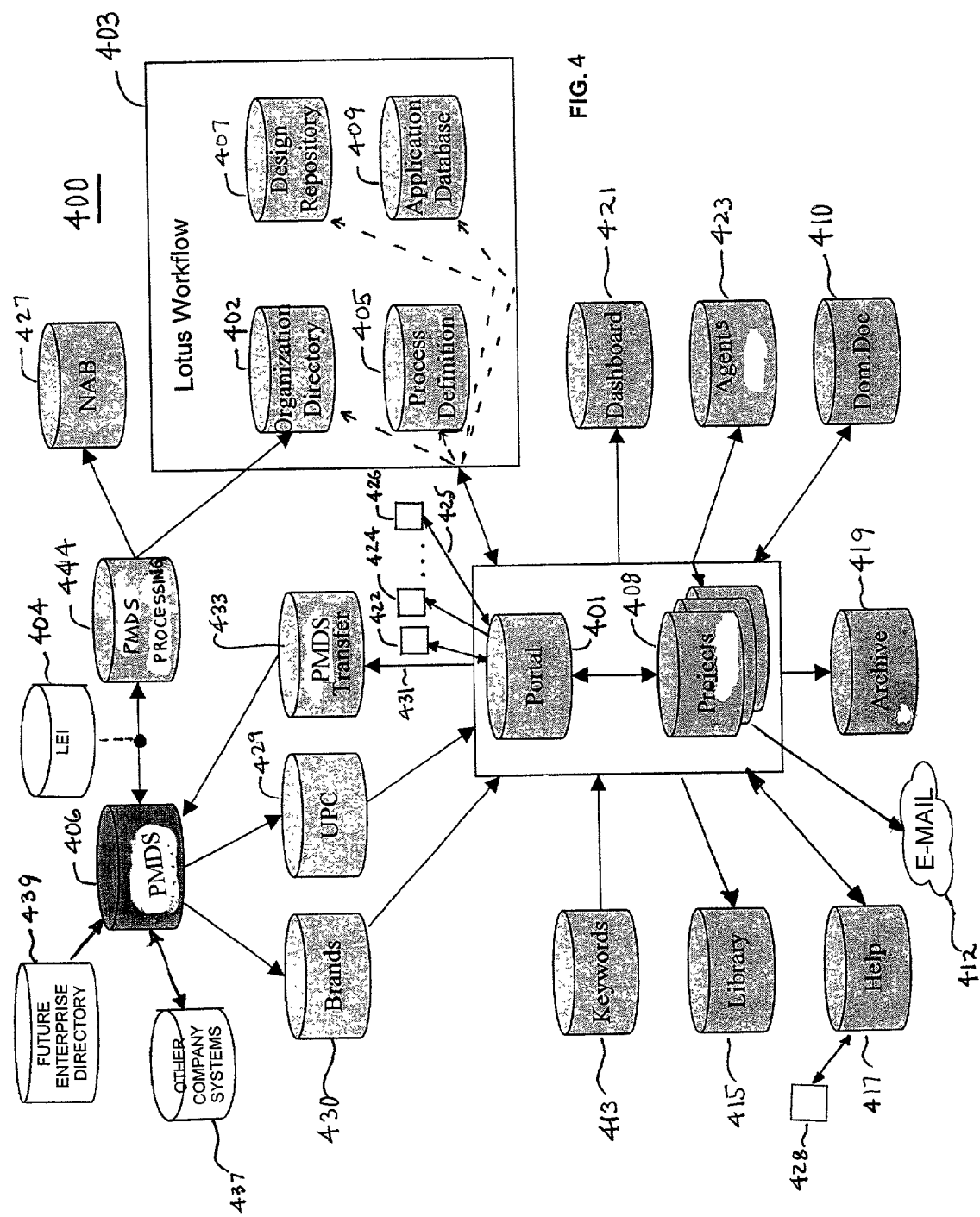
FIG. 4 is a graphical representation showing a computer-based project planning system for implementing the method of FIGS. 1–3, according to another aspect of the invention.
Figure 7B:
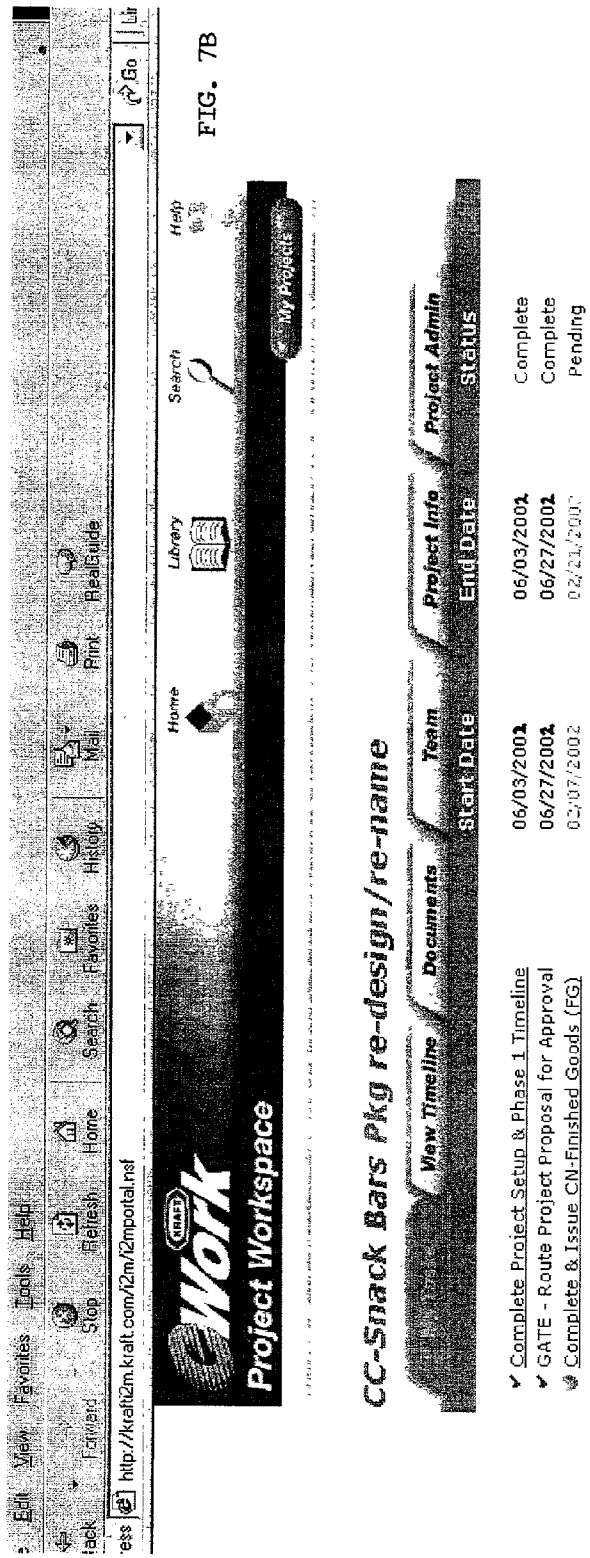
FIG. 7B is a diagrammatic view of an embodiment of the graphical user interface of the present invention showing the screen display of a user's tasks via an associated tab bar for projects being managed by the system of FIG. 4.

FIG. 7A is another diagrammatic view of an embodiment of the graphical user interface of the present invention showing the screen display of a user's project list of projects being managed by the system of FIG. 4. FIG. 7B is a diagrammatic view of an embodiment of the graphical user interface of the present invention showing the screen display of a user's tasks via an associated tab bar for projects being managed by the system of FIG. 4.

Referring again to FIG. 4, as to server software, the portal 401 can be developed on a Lotus Domino R5 platform. As to development software, Lotus R5 Notes client can be used to develop the design elements for the portal 401. In one aspect, the portal 401 utilizes Javascript to maximize client side processing. For example, the portal could use Javascript to generate error messages if the user attempts to submit a form with missing information.

In one embodiment, the project planning system 400 is a Domino hosted, web-based application that supports the tracking of projects throughout the project's life. Users access the system 400 via a web browser residing on their computers through the portal or web server 401. The inventive project planning system 400, as exemplified herein, incorporates and integrates several Lotus software development software products: Lotus Notes Client, Domino.Doc and Lotus Workflow (e.g., Lotus Workflow 3.0). In this embodiment, the system 400 uses Lotus Workflow 403 in assisting with the routing and approval of tasks and documents for a given project. Some of the task deliverables, items such as the results of a plant test run (e.g., FIG. 3, task 352), are stored and managed from within the Domino.Doc 410. E-mail 412 is used to both manage assigned project team members activity as well as delivering documents to other individuals having other tasks assigned to them in the project development. In one embodiment, other than the Workflow design tasks, all user access from stations 422, 424, or 426, and so forth, to the system 400 are made through a web browser residing on the client (e.g., the user's personal computer or laptop computer). Lotus Workflow, Domino.doc, and Lotus Enterprise Integrator are products of International Business Machines, Armonk, N.Y.

In one aspect, Domino translates the content of a Notes document content to HTML (HyperText Markup Language) on the fly when serving it up to a user or client. The web server and portal 401 includes standard web server functionality such as an HTTP server, an HTML translator and server side software (not shown). The client side or user is equipped with a standard browser, such as Microsoft Explorer or Netscape Navigator, and a graphical user interface. The web browser can support Internet or Web protocols (i.e., HyperText Transfer Protocol (HTTP) and TCP/IP). The system 400 permits non-HTML objects to be accessed by user stations 422, 424, or 426, from a web browser residing on the client (e.g., a personal computer). Alternatively, the user stations also each can have suitable software loaded on the user station for reading and generating documents used in the work flow, such as WORD, EXCEL, and so forth. The users have two-way communication lines 425 providing input and access capabilities with the server 401. The system 400 includes a database, such as Domino.Doc 410, for storing non-HTML objects.

In one aspect, when a system user requests a non-HTML object from a database using a web browser, the web browser transmits the request to a web server. The web server 401 locates and retrieves the requested document, and the server includes a module that translates the document into HTML format supported by the web browser and sends the HTML downloaded object to the client side browser for display on a graphical user interface. Arrangements for using a standard browser to access and retrieve objects in a non-HTML database are described in U.S. Pat. No. 6,064,977, which teachings are incorporated herein by reference.

Alternatively, non-HTML applications, such as Lotus Notes, can be supported by accessing a user terminal loaded with Lotus Notes client software that communicates with a server loaded with Lotus Notes server software. However, this requires the opening of a separate window or application at a user station appropriate for opening a retrieved non-HTML document stored on the user station.

When setting up a project, project leaders enter project-related information as well as select all the process tasks that are required. Upon completing the project set-up, all the required tasks are generated and stored in the appropriate division database. As the project progresses, managed by Domino Workflow, project team members have an area where they can monitor which tasks they are required to assist on or complete. Members indicate when they have completed a task. If the task has required documentation, the project team member saves the document(s) at the same time. The project leader updates the information on the project through the portal when the project is terminated, whether it is completed successfully, abandoned, or put on hold. The entry of task assignments, scheduling of tasks, completion of tasks, messaging, calendaring, and approvals are performed directly through the web browser, and a separate window or application does not need to be opened.

Referring still to FIG. 4, Lotus Workflow 403 uses an organization directory 402 to manage the routing and approval tasks for a given project. It is primarily based on "Person" documents. These Person documents define data for an employee, items such as e-mail address, organizational and functional rules, and relationship. The organization directory is populated by Lotus Enterprise Integrator (LEI) 404 with data from project management database system (PMDS) 406, which can be an Oracle PMDS database or AS5000 Cisco PMDS. PMDS 406 provides product information which is stored as keyword documents within the project planning system. PMDS 406 also provides employee data, which is managed by the Domino Workflow Organization Directory 402. LEI 404 synchronizes with PMDS 406, which allows for the creation and maintenance of the Person documents. This synchronization is an automated, batched task. Using the LEI 404, integration with the PMDS 406 to push project related information to the Oracle database and pull project information from the PMDS database 406. The project information may then be retrieved by other database systems within the enterprise including the Domino-based label and packaging development support system 430.

LEI 404 is a server-based distribution product that enables high performance, scalable exchange of data between Lotus workflow 403 and a large number of host and relational applications. The LEI 404 and PMDS processing module 444 is used to transfer updated data from the PMDS database 406 to the Lotus Workflow Organization Directory 402. This happens in a scheduled, batched mode. There generally is real time access provided to the PMDS database 406.

Lotus Workflow 403 is a stand alone product that works on top of Domino and provides users the ability to develop, manage, and monitor business processes and help them eliminate the downfalls of paper-based work. Lotus Workflow includes several major bundled components, discussed below.

The Lotus Workflow Organization Directory 402 contains information related to the users of Lotus Workflow 403. It keeps track of and manages the people, roles, relations and resources that, when combined, allow for processes and activities to be completed.

The Lotus process definition workflow engine 405 is the core of the workflow system 403 that executes the workflow routing according to the workflow definition routing rules.

The Lotus design repository 407 is a visual interface used to design and manage processes and define the routing rules. This is the routing rules are defined, and as needed, where changes can be made to routing rules. In a preferred embodiment, all the processes and subprocesses for the inventive project planning system are defined using this tool. A Lotus workflow viewer forms part of the design repository 407, and it is used to view the status of workflow instances and to track where work items are in the process. Since the inventive project planning system 400 is a web-based application, the usage of the Workflow viewer 407 can be restricted to support staff assigned to the portal.

The Lotus application database 409 is where the routing rules reside on the system. The predetermined routing rules dictate what happens when during the management of a project by system 400. They automatically coordinate tasks and a predetermined process flow.

Referring still to FIG. 4, database transfer module 433 operates on a scheduled batch mode to retrieve specific project information, such as title information, financials, etc., from projects database 408 via portal 401, and transfers a copy of such information to the PMDS 406 where it is stored. This retrieved information can be used by other systems within the organization that are otherwise separate from automated system 400, such as indicated in FIG. 4 as features 437 and 439. The NAB 427 is a global organizational directory including a firewall profile on all potential users of system 400, as a threshold security measure. By comparison, organizational directory 402 has authentification functions more narrowly directed to which projects a user should have access, and so forth.

The Agent log 423 is code residing on the system providing scheduled batch programs that automatically, on a scheduled basis, sends agents to projects database 408 to sort projects to find late tasks, and the like. The database 408 in turn sends agents to domino.doc 410, which is used as a vehicle to send out e-mail reminders and notifications on the identified late tasks, and the like. For example, every Monday morning, the Agents log 423 could be programmed to find late tasks on projects stored in the projects database 408, which in turn provides that information to Domino.doc. 410, which sends out the late task notifications to the respective task owners.

Domino.Doc 410, also a Lotus product, provides complete document life cycle management capability-from authoring through review, approval, distribution and archiving-for every user and every document in the organization, from narrowly-focused niche applications for small groups of specialists, to broader, scalable applications deployed enterprise-wide to every user across the organization.

Figure 5:
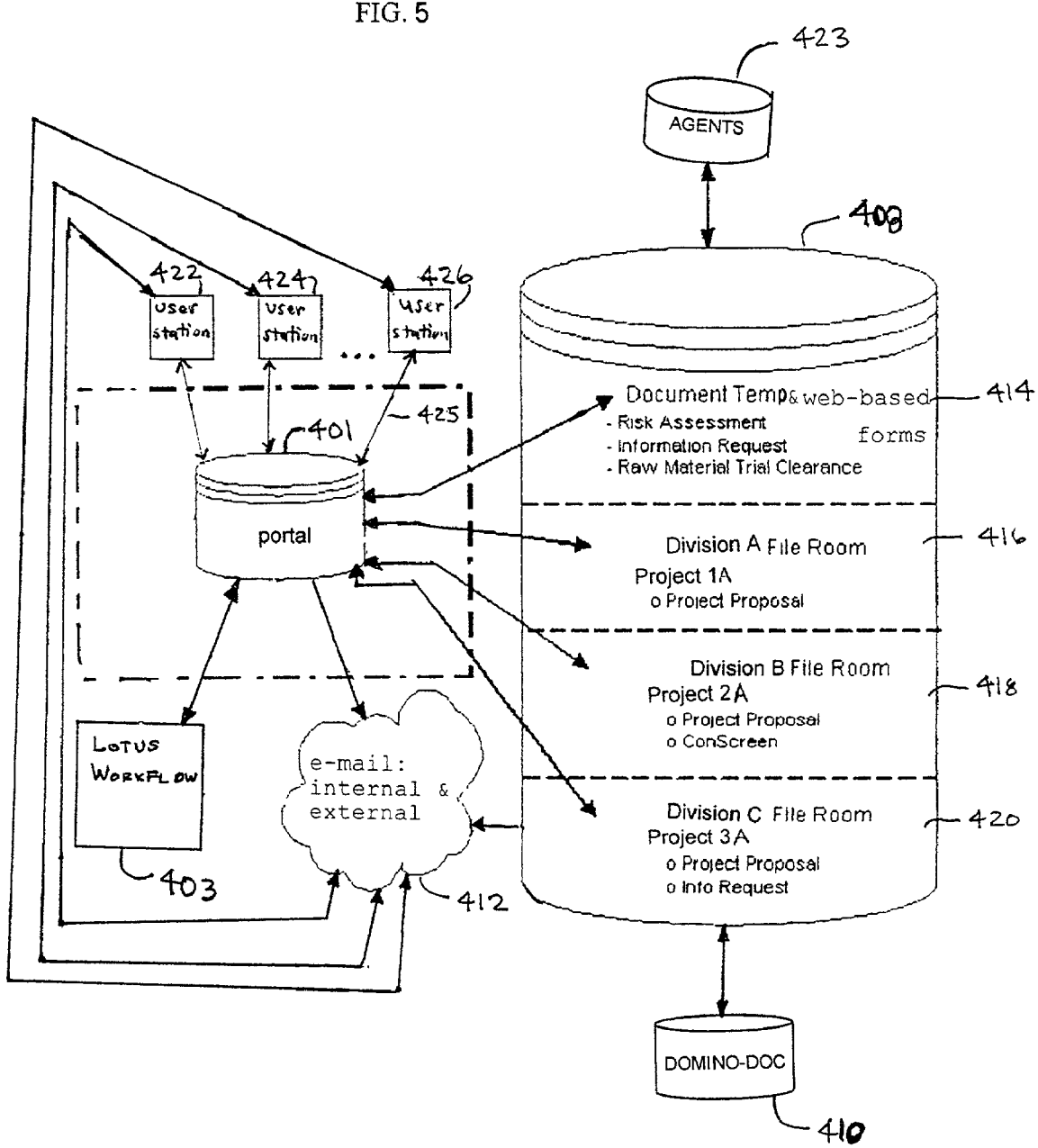
FIG. 5 is a graphical representation showing further details on the interrelationship of selected specific features of the computer-based project planning system of FIG. 4.

As shown in more detail in FIG. 5, Domino.Doc 410 employs a library metaphor by establishing a hierarchy that allows for a logical grouping of documents. At a high level, a file room can be established within Domino.Doc. This file room has one or more file cabinets. Within a file cabinet, there can be one or more binders or folders. A binder or folder would contain the individual document(s). In one aspect, a file cabinet is assigned to each project under development on the automated system of the invention.

For the project planning system 400, the majority of project-related documents are stored within projects database 408. Individual file rooms 414, 416, 418 and 420 can be established for each division that uses the project planning system 400, as illustrated in FIG. 5 as Divisions A, B and C. By way of illustration, projects 1A, 2A and 3A are archived in the file rooms for the respective divisions. One or many different projects could be archived in this manner for each division. Cabinets will exist for each of the division groups or groupings. A cabinet for a given topic or multiple topics also can be included within the division file room. Binders or folders can be established for each project, and project documents are stored within the binder or folder. The divisional file rooms or cabinets thereof must be established before projects can be created for that division. The file rooms or cabinets can be created automatically, or alternatively, the file cabinets can be created by an individual. Once a division file cabinet is established, the inventive project planning system utilizes Domino agents to create the appropriate binder hierarchy for each new project as they are generated by project leaders.

As to the Division Project Databases 416, 418, 420, each Division Project database contains all the needed project-related information: tasks, documents, document links or some combination thereof. In one implementation of the invention, there is one division project database assigned for each of division and authorized users access their respective division database via the portal 401.

The project planning system also utilizes an inherent database size management feature of Domino.Doc 410. As cabinets or binders reach a predefined size or document number threshold, Domino.Doc creates additional databases that support the growth of the library.

Domino.Doc 410 also includes document templates and forms 414 needed in the completion of a number tasks during project development, as discussed elsewhere herein. The templates are Microsoft Office 7 based documents, while the forms are integrated into tool tasks. In order to further drive project standardization, document templates or boilerplates of commonly used documents are stored in Domino.Doc 410. A general access file cabinet within Domino.Doc is established that will contain these templates. If a task requires a common document, the user is able to download a boilerplate from the template file cabinet. Project team members can access this file room and download the appropriate template. If required, the project team leaders can store the completed document(s) in the appropriate project binder.

Figure 7C:
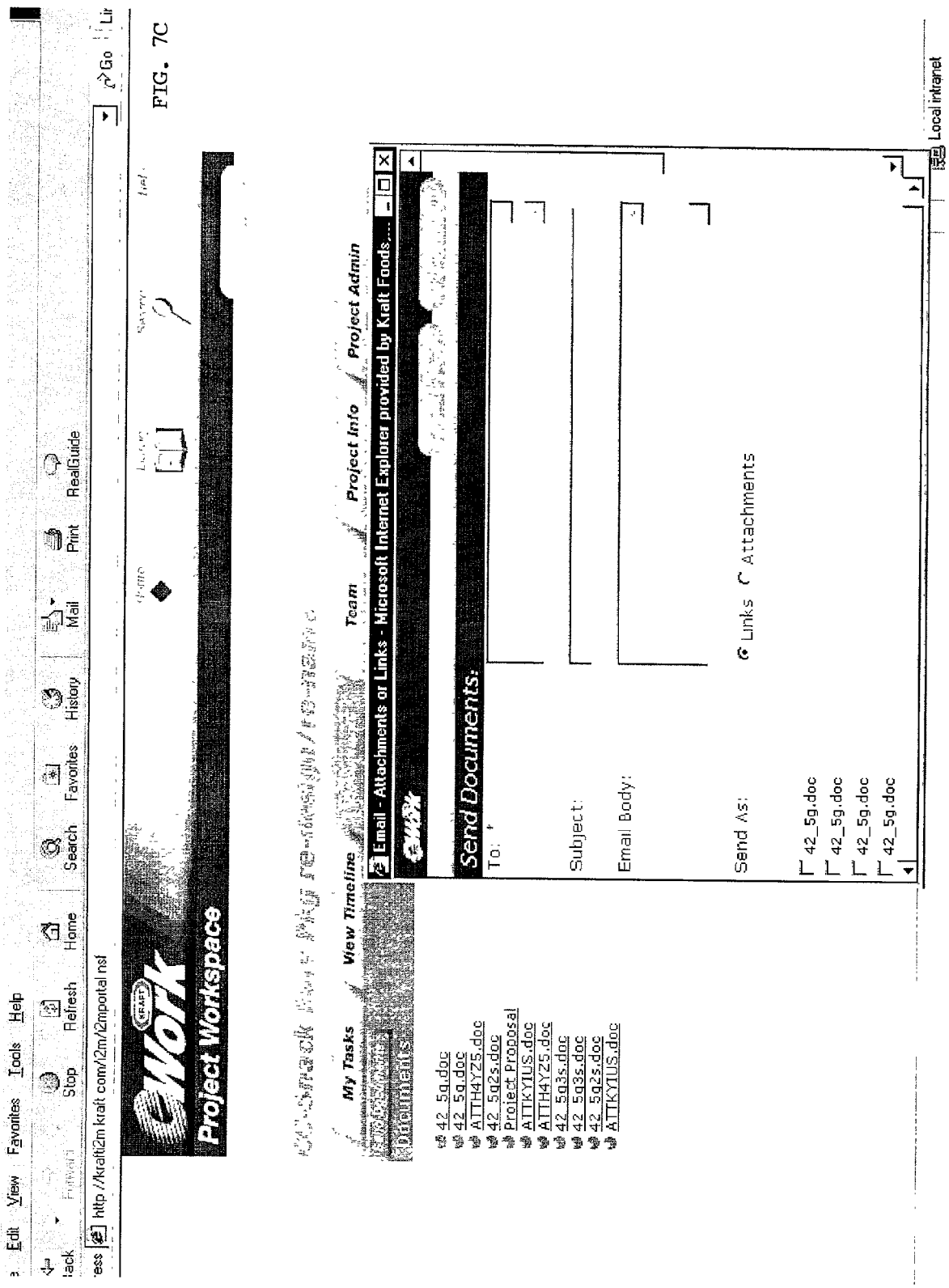
FIG. 7C is a diagrammatic view of an embodiment of the graphical user interface of the present invention showing the screen display of a displayed window on the user's graphical user interface for e-mailing project related documents for a project being managed by the system of FIG. 4.
Figure 7D:
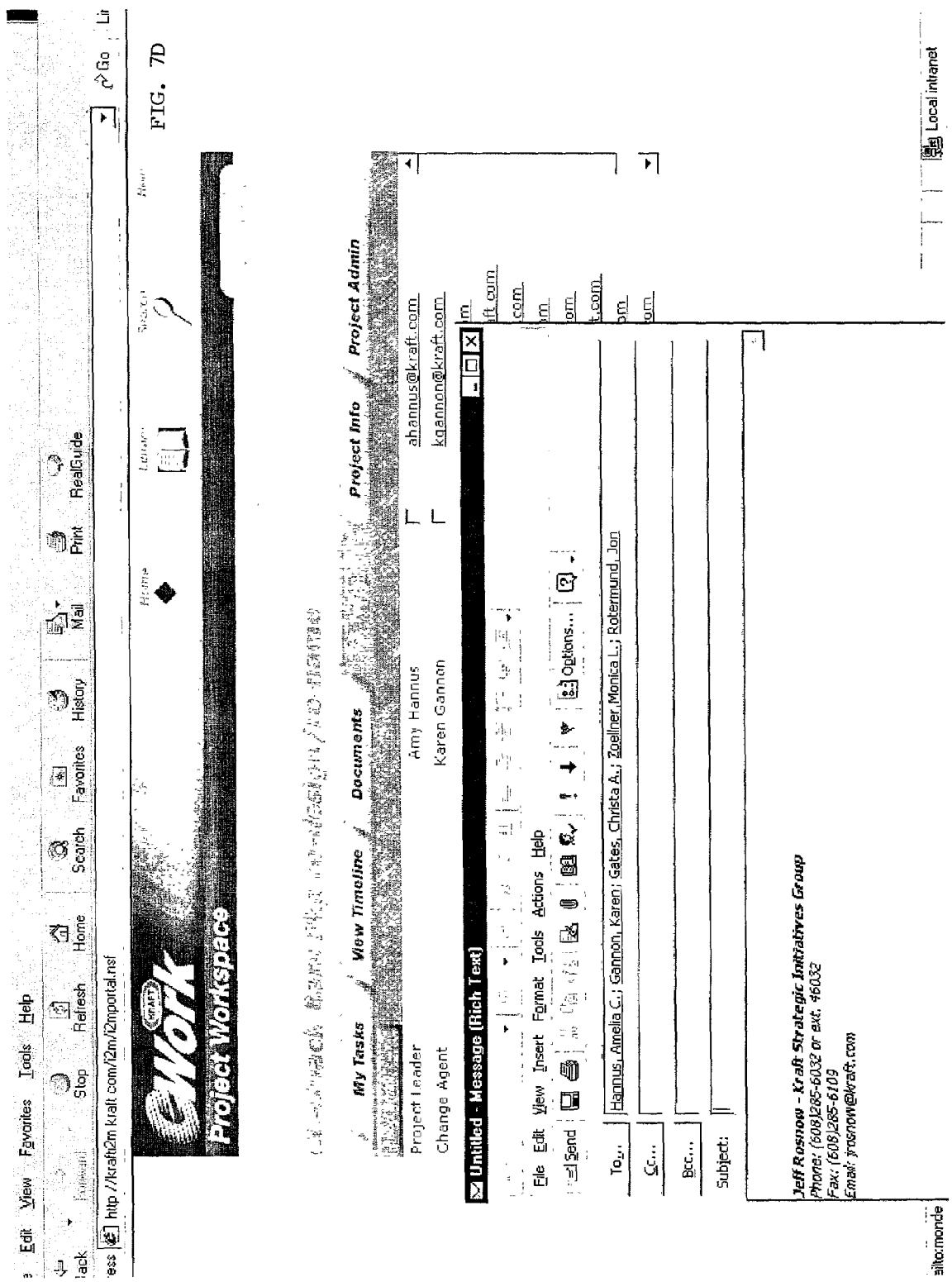
FIG. 7D is a diagrammatic view of an embodiment of the graphical user interface of the present invention showing the screen display of a displayed window on the user's graphical user interface for e-mailing project team members for a project being managed by the system of FIG. 4.

The Lotus Workflow engine 403 also generates and sends electronic mail ("e-mail") 412 to project team leaders as tasks get started or completed (see FIG. 5). In addition, project leaders or administrative assistants therefore also manually generate and send e-mail from within the portal 401. These e-mails can contain file attachments and the e-mails may be sent to individuals outside the enterprise, if needed. Project team leaders also can send e-mail containing file attachments from within Domino.Doc. For instance, FIG. 7C is a diagrammatic view of a related embodiment of the graphical user interface of the present invention showing the screen display of a displayed window on the user's graphical user interface for emailing project related documents for a project being managed by the system of FIG. 4. FIG. 7D is a diagrammatic view of an embodiment of the graphical user interface of the present invention showing the screen display of a displayed window on the user's graphical user interface for e-mailing project team members for a project being managed by the system of FIG. 4.

Lotus Workflow 403 is used to define the major processes and corresponding sub processes utilized within the project planning system. The process definition is created using the Workflow Architect. As projects get generated, the process definition for each selected task is dynamically retrieved from the workflow process definition database.

The label and packaging development support subsystem 430 indicated in FIG. 4 is a Domino-hosted web based ancillary application that is used to help support product label and packaging development efforts. It is an optional feature to this invention. That is, the portal has projects that can have label and packaging selection related subtasks which are interfaced with the subsystem 430 dedicated for that purpose. Other details of label development subsystem 430 are described later in connection with FIGS. 8 and 9A–9L, and reference is made thereto. The keywords database 413 contains system information that supports the use of the portal 401. For example, there may be a keyword document that contains all the divisions of the business organization. When a project leader creates a project, (s)he may select a division from the list by the keyword document. Additionally, data such as file location and file names are kept as keywords. This maximizes flexibility when maintaining the application. Using the Workflow Process Definition database 405, a project leader is able to specify which tasks and documents are required for the project when creating a project (e.g., task 132). The Workflow Process Definition database 405 provides the list of tasks possible for a given project type. To maximize flexibility, all of the processes and subprocesses defined in Lotus Workflow are dynamically retrieved at the time of project creation. The project leader can then pick and choose from this list. This ensures that the latest versions of the defined processes are available when a project is initiated. The Division Project databases 416, 418, 420 are supported by the Keywords database 413, in which will the keywords database 413 provides listed type data such as brands and divisions.

The project development system also offers security measures that differentiate between external clients, e.g., suppliers, vendors, and internal clients, e.g., employee project team members, to control the access of the client to the system resources after the system sorts the users access by the information entered at an authentification screen (e.g., see FIG. 6). The authentification screen displayed upon entering the portal's URL generally will request entry of at least a user name and password. Cookies can be used to maintain user activity information on the system 400 and establish user profiles, which reduces user load on the system. For example, the portal 401 might set a cookie that stores the user's division. Whenever the user accesses the portal 401, the system could look at the cookie to verify the user's division and display that division's information, as part of the authentification protocol.

The functionality of the UPC 429 involves sales files including stored information on universal product code (UPC) and UCC numbers. UPC 429 is described in detail in connection with the subsequent discussion of FIGS. 8 and 9A–N, and reference is made thereto.

In another aspect, the graphical user interface provided for users of system 400 can provide contextual help, such as best practice tips and so forth, as a "pop-up" or a "scroll in" that appears on the user's display screen when the user moves the cursor arrow over and rests it on a button or heading in the screen (e.g., see FIG. 7A and FIG. 7G). The project development system also has built-in e-mail functionality capability. Using internet e-mail, e-mail documents can be separately sent or received without the user needing to back out of the screen being viewed. E-mailed documents can be sent as an attachment or the recipient can be given a URL to automatically go retrieve it when the attachment is clicked on. When sending e-mail, a team tab feature is also provided permitting a user to check a box next to a name(s) of desired team member recipients without having to scroll out of a screen to send the e-mail. The inventive system also has enhanced report feature for report viewing and printing functionalities, such that specific project timelines in tabular form, GANTT charts, comments reports, issue reports, and so forth, are printable browser-based documents. viewed. E-mailed documents can be sent as an attachment or the recipient can be given a URL to automatically go retrieve it when the attachment is clicked on. When sending e-mail, a team tab feature is also provided permitting a user to check a box next to a name(s) of desired team member recipients without having to scroll out of a screen to send the e-mail. The inventive system also has enhanced report feature for report viewing and printing functionalities, such that specific project timelines in tabular form, GANTT charts, comments reports, issue reports, and so forth, are printable browser-based documents.

Figure 7E:
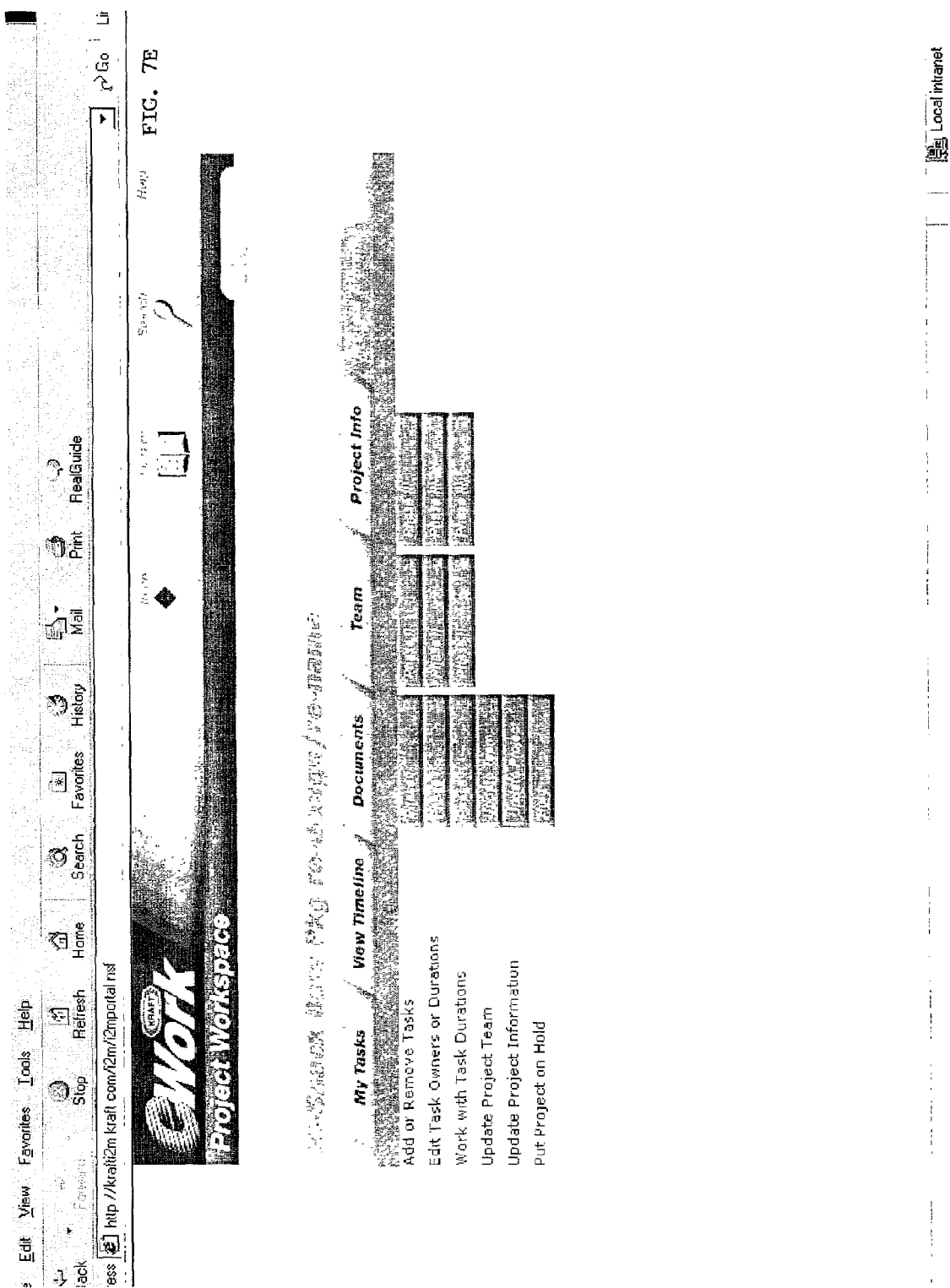
FIG. 7E is a diagrammatic view of an embodiment of the graphical user interface of the present invention showing the screen display of a displayed window on a project administrator's graphical user interface used for entering changes to tasking, task timing and project information for a project being managed by the system of FIG. 4.

The system 400 also enables a team leader or project administrator to make changes and adjustments in the tasking assignments, task definitions, and scheduling applicable to a given project during the development cycle. For instance, FIG. 7E is a diagrammatic view of an embodiment of the graphical user interface of the present invention showing the screen display of a displayed window on a project administrator's graphical user interface used for entering changes to tasking, task timing and project information for a project being managed by the system of FIG. 4.

Figure 7F:
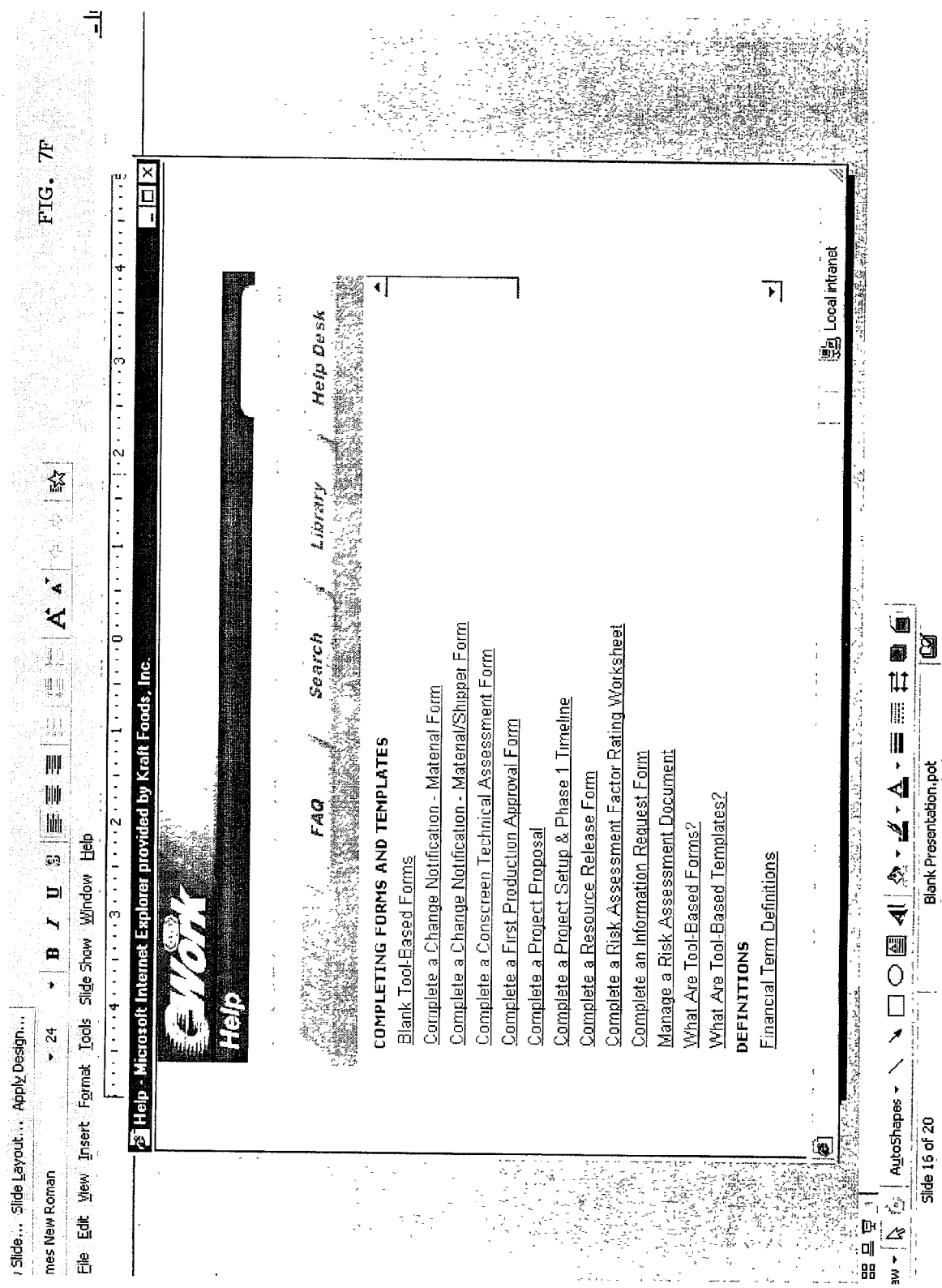
FIG. 7F is a diagrammatic view of an embodiment of the graphical user interface of the present invention showing the screen display of a displayed window on a user's graphical user interface with on-line textual help, FAQ, Search, Library and Help Desk windows for projects being managed by the system of FIG. 4.

The help feature 417 shown in FIG. 4 is accessible through links or buttons provided by the system to the user via the user's graphical user interface. For instance, FIG. 7F is a diagrammatic view of an embodiment of the graphical user interface of the present invention showing the screen display of a displayed window on a user's graphical user interface with on-line textual help, FAQ, (key word) Search, Library and Help Desk windows for projects being managed by the system of FIG. 4. The Help & Reference database 417 (in FIG. 4) contains help documents that will support the users of the portal 401. Help 417 also has instant messaging capability and an on-line chat feature between users and one or more helpers accessing the station through user stations, such as user station 428, which serves as a "help desk." It also lets a developer person "at a help desk" remotely view the displayed screen(s) on a user's computer to help address an issue the user needs help on. The process library database 415 contains electronic-based help information accessible to users to guide them through the process, if needed. The database 415 has accessible explanatory information on the steps and tasks required for each phase of the process, comprehensive gate information, and planning aids for project trams and descriptions of task nuances for different types of projects. Archive 419 contains retrievable, viewable and printable information on all current and previous projects developed using the system 400.

A senior management dashboard 421 provides customized display screens for senior management providing overview information for projects underway in and across divisions, including summary information such as on financials, project names and planned and current ends, and specific location of the project along the process flow, and this can be done via a visual status format. For instance, FIG. 7G is a diagrammatic view of this embodiment of the graphical user interface of the present invention showing the screen display of a displayed window on a senior manager's graphical user interface in "dashboard" summary format for projects being managed by the system of FIG. 4. Again, the authentification and security functions of the system govern which users will be permitted access to such specialized screens.

The features of the project development process workflow of this invention implemented using system 400 will be further understood by the way of the detailed discussions for FIGS. 1–3 set forth below.

Referring now to FIGS. 1–3, an automated product development method is illustrated according to an aspect of the invention that is implemented by way of system 400 that includes three phases. Each phase is completed by implementing associated tasks in a process flow that cascades through tasks variously involving idea generation and verification, idea development, and execution to ultimately converge at a project ready for market launch.

As an overview, the first phase I (100), illustrated in FIG. 1, includes "concept approval" and "project proposal" tasks. This phase involves taking an idea and validating it as a possible project for the business enterprise to develop. The end result of this phase is the project proposal. The project proposal is a document which is the result of putting the idea on paper and performing some preliminary research on the idea's potential. The project proposal is the first major gate; non-acceptance of the proposal by the enterprise management will terminate the project.

The second phase II (200), as illustrated in FIG. 2, is business proposition planning and involves collaborating with multiple enterprise groups and individuals to determine how the idea will come about. It can involve determining customer response and demand as the enterprise reviews existing manufacturing capabilities. The business proposition document is an input to this major gate.

The last phase, phase III (300), and illustrated in FIG. 3, is first production approval and sales rollout, and is considered an executional phase. It is concerned with all the tasks and documents required to get the product on the shelf. Again, there is a gate at the end of this phase which would determine the project's continuance. Each development phase will now be illustrated in greater detail.

Referring to FIG. 1 in more detail now, illustrating Phase I of the inventive method of developing an idea through market launch, the following tasks and subtasks are included:

Idea Generation and Submission 102:

This task includes a series of subtasks including, for example, internal team discussions that result in the selection and report of the top new ideas for projects, or ideas received from other company personnel. The overarching proposition is that idea generation is essential for the enterprise to optimize growth opportunities and platforms. Each new project suggestion has a unique project identifier assigned to it by the system, typically a numeric or alphanumeric code identifier. This unique identifier is used to identify and track the concept suggestion throughout the development process, whatever its outcome. The planning system notifies task members of their assigned tasks and any due dates, and prompts for receipt of input regarding the completion thereof and any documentation required.

Idea verification 104:

The project planning system includes a knowledge repository as one or more databases in which project information is accumulated as projects are completed, dropped from consideration, or put on hold or halted during development. Thus, institutional knowledge and experience developed during previous or currently ongoing separate projects to develop new ideas is electronically captured in a comprehensive, organized manner in a searchable computer database within the inventive planning system. This feature permits a system user, and an assigned evaluator, such as a project leader, to investigate and identify any archived previous or ongoing related projects within the enterprise that might be related to the proposed new idea, and review the results of any identified related projects. The search results thereof are outputted to a display unit of the browser-enabled work station of the user or assigned evaluator(s). In addition to previous project identities, subject matter, tasking, scheduling and outcome information and so forth, support documents generated in connection with tasks and decisions associated with the previously proposed projects also can be accessed and reviewed in this regard as well. Users have search capabilities against all archived projects.

In this way, the assessment of the originality of a newly proposed idea is not subject to the vagaries of scattered recollections of personnel within the enterprise, nor subject to a burdensome paper-based searching within the enterprise if even possible or practical. In this way, the evaluation of the originality and/or merit of newly conceptualized project ideas is greatly enhanced by taking into account electronically archived and searchable accumulated institutional experience of the enterprise in a manner that permits reductions in duplication costs. Alternatively, this capability makes it possible to identify related ongoing projects with the newly proposed idea providing opportunities for collaboration or sharing of development resources.

Although a person thinking of submitting a new project idea can use this search feature, assuming they have appropriate authorization to access the system, an assigned project person or team of persons have a responsibility and task to search the existing projects archived in the database and conduct the evaluation of the new proposed project by comparing it with prior (including currently ongoing) proposed projects according to predetermined criteria.

The project leader is responsible for entering acceptance or non-acceptance information at this juncture into the project planning system where the information can be stored along with any associated documentation or report output of this evaluation and decision. The results of this and other gate decisions are stored and indicated in the information displayed by the system on the particular project. Any support or related documentation, which can be non-HTML documentation, is stored in a database such as Domino.Doc, even if the project is halted at this point.

Idea Market Assessment Planning 106:

This task involves a series of activities that allow for idea evaluation and refinement from a market perspective of the top ideas/protocepts selected in the preceding subprocess concerning verification of the uniqueness of the new proposed project. Also part of this task is a determination of the type of any consumer test that will be used to validate whether the idea has significant growth potential. This series of activities yields a move from refined ideas/protocepts to concept and a clear direction on future consumer tests. Generally, it is decided whether a consumer screening and testing, i.e., a so-called AConscreen@ for purposes herein, is needed. As with the other tasks and subtasks mentioned herein, task notification is given to assigned team members via the messaging capabilities of the system, and assigned persons indicate completion of their assigned tasks in the system.

Concept Technical Feasibility 108:

Technical feasibility is a way to validate the enterprise's ability to complete the project. It is at this point where questions such as whether the enterprise is capable of providing the proper resources, or if the right technology exists at the current time. The project team will meet to determine if the project can (or should) be completed under the enterprise's technical infrastructure. Based on this discussion, a decision is made as to whether the project should continue, be staged, or be put on hold.

The project leader will route a document describing the project to a research and development (R&D) group leader for input prior to the project team meeting. The R&D group leader is responsible for assembling the right people in a meeting setting to complete the analysis. The project leader is responsible for posting documentation output of this meeting in the system and filling in the online decision criterion on the outcome thereof in the project planning system. Task 110 in FIG. 1 reflects this decision. The results of this and other gate decisions are stored and indicated in the information displayed by the system on the particular project.

The feasibility document is an MS Word template that resides in Domino.Doc. The completed document is stored in Domino.Doc, even if the project is halted at this point.

Concept Development and Testing 112:

If deemed appropriate for the type of project being considered, the task involves a series of activities that starts with the development of concept boards. Concept boards are generally a one page document, professionally done, that is able to visually communicate to the consumer the value and benefit of product concept. This can involve a color picture of the proposed new or changed "product." After the concept boards are completed and approved internally, the enterprise conducts consumer screening tests called "Conscreen(s)" for short here.

Consumer Concept Screen Results 116:

This task involves an outside study that allows the enterprise to receive feedback from consumers on the new concept. This is an important task in the development of a new product. An analysis of a concept board of the new product is made with potential consumers and provides the enterprise a quantitative hurdle rate that is compared to previous test(s) data to help in decision making. Based on the results of this study, a decision is made whether to continue the project and entered by an assigned team of reviewers.

Any related documentation to this review, such as a PowerPoint presentation or word documents are made available for viewing and downloading by the assigned team of reviewers via the project planning system for the given project identifier. This documentation is posted to the system for storage in the project binder in Domino.Doc 410, discussed in greater detail below in connection with FIG. 4. The documentation is stored in Domino.Doc 410 whether or not the project continues.

Concept Refinement 118:

Sometimes the results from the consumer screening tests ("conscreen") do not meet an enterprise's internal hurdle rates. But, the assigned review team thinks that the idea/concepts is strong and needs refinement. This task involves a series of activities that allows for the refinement of the concept. It ends in a decision gate 120 on whether to: 1) retest through consumer screening test, or 2) proceed to a volume forecast task decision, 3) or end the project.

Volume Forecast 124:

A volume forecast task 124 is an estimate compiled to determine the early read on the potential volume that a new product concept may generate for the enterprise. The results are presented for analysis by an assigned team of reviewers. At this point, the team's decision is made as to whether the project is worth pursuing.

As with the consumer screening results, the consumer insights and strategy manager is responsible for placing the decision in the system. The document is stored in Domino.Doc 410 whether or not the project continues.

Risk Assessment 129:

Product risks are analyzed in assessing the amount of risk that a given project is subject to. The project leader is responsible for routing an Excel spreadsheet that calculates risk to selected members of the project team. Each member has the opportunity to complete a checklist of predetermined risk factor criteria. The project leader working with the team then analyzes the results, and creates suitable action plans for the project development.

The summary sheet is attached to the project proposal when it is submitted. The project planning system manages the routing of the Excel spreadsheet electronically. The completed document is stored in the project binder in Domino.Doc.

Creation of timeline for phase II (task 130) and phase III (task 131):

The project leader establishes a time schedule for the completion of the various tasks that will be required to complete phases II and III of the project.

Initial Project Planning task 132:

A timeline process is used to define the activities that are associated with a project. A form also defines who is responsible for each activity and duration time period for each particular activity in the given phase of the project. The project leader working along with the designated project team selects the activities that apply to the project. Duration time and responsibilities are set based on the activities selected. In this way, task owners are assigned in a timeline and the time durations allotted for tasks.

Project Proposal Generation 133:

A project proposal document is used that standardize project information for approval to upper management and to document project information. The project proposal document incorporates information from, or requires reference to documentation generated in, the preceding tasks. The system 400, described in greater detail in connection with FIG. 4 herein, permits a user or users tasked with generating the project proposal the ability to electronically retrieve those documents for reference as needed through their browser-enabled interface with the system 400.

The project proposal is a form filled in by the project leader or administrative assistant. Some of the fields are auto-populated from the project set up form. For example, the Project Proposal can be generated as a Notes document. Once approved, the document is routed to a label development support system 430, illustrated in FIG. 4, and distributed to the appropriate team members. Assigned senior management reviews the project proposal, once completed and routed to them through the system 400, and electronically enters the disposition in the system 400 through their browser interface. The project proposal is the first major gate 134 of the project development and the conclusion of Phase I.

Phase II (200)—Project Development:

This phase involves processes required to develop the actual product, manufacturing capabilities and all associated marketing plan element. The major gate at the end of this phase is the business proposition document and the completion of key specifications of the product and packaging therefor.

Final Project Planning task 202:

The form generated for task 132 in Phase I, described above, is subjected to a final check on the accuracy and completeness of assigned timeline task owners and task durations. Once this final check is completed, it will kick off the project workflow. A project leader or her (his) administrative assistant has the ability to change any option selected before activity is generated for a particular task. The project leader is responsible for prioritizing resources and deploying them.

Information Request 212:

An information request document is used to gather information from plant(s) to determine if the plant(s) is/are capable of producing the product within certain parameters. The responses are analyzed in task 214 to determine plant capacity and determine the preliminary manufacturing cost. These documents are used to determine which low cost manufacturing plant is awarded the new product (in Phase III). An information request document is a Word template that resides in Domino.Doc. The project team evaluates both internal and external plant capabilities. A request is sent to a specified plant(s) to complete an assessment. The document is returned to the operations business team leader. The document must be stored in Domino.Doc. This will happen multiple times, generally in parallel.

Marketing Plan Development 204:

Much of the Phase II elements deal with the development of product, process and package. However, the development of the marketing plan elements are also important that will be explained in the business proposition of task 208. This is a series of tasks that finalizes which market segment the product is targeting and which attributes are extremely important to the consumer. This allows the enterprise to establish a point-of difference and is the necessary predecessor to naming the product.

There are at least five major elements of the marketing plans: 1) brand positioning and essence development; 2) graphic label design development including determining what does the package label look like. This is addressed by separate pilot tasks and the integration to label development support system 430; 3) advertising and media plan development including determining what are the elements of the enterprise's advertising media plan, as well as planned costs and timing; 4) consumer promotion plan development including determining what are the enterprise's plans to promote the product on package, in the store, in print media, and so forth and what are the strategies, planned costs and timing; 5) trade release plan development including determining: geographical rollout plans, trade spending plans, sell-in plans, authorization plan, and so forth. Also, approximate planned cost and timing is addressed. One task notification and completion is provided for each of the series of activities for advertising and media plan, consumer promotion plan and trade release plan, in task 206.

Product Development 220:

An assigned product R&D developer is assigned responsibility for all the subsequent tasks in this sub process. A prototype is developed and fully tested with kitchen performance and tolerance tests. The shelf life and formula cost are estimated. Generally during these activities the enterprise is determining if the enterprise is using new (unique) raw materials. Assigned product R&D team members execute these tasks.

Unique Raw Material Request 221 and Response Review Gate 222:

A new (unique) raw material is a material that is not currently used or purchased by the enterprise developing the idea to market. If a new (unique) raw material is requested in the phase II timeline, in task 221, a request for material information sheet is completed and sent to a supplier. The request for material information sheet is a MS Word template with a checklist of all the necessary information that the identified supplier will have to provide to the enterprise. The request for material information is a template that resides in the Domino.Doc template cabinet.

In task 222, the checklist and corresponding information is returned by the potential supplier to the project team and subjected to internal review for approval (or disapproval). If the new raw material is approved, R&D saves the completed WORD template into the project, which resides in Domino.Doc, giving approval for the use of this new RM in all future bench-top to plant test. A raw materials specification is an enterprise specification type that highlights all the technical, chemical requirements of the raw material and is essential in directing the purchasing process and formula development.

If an enterprise manufactured ingredient (EMI) is an ingredient produced by the enterprise facility to be used by another facility or product, for example, an enterprise product employed as a subpart or ingredient of a final product). The decision to use an EMI is determined on the phase 11 timeline. In this series of activities the enterprise determines what EMI is to be used and what manufacturing facility sources the EMI.

As overall product development continues, links can be made to other essential assessments needed on the product (e.g., product quality or safety assessments). At this point, the enterprise generally will have produce internal prototype(s) that may use new raw materials or EMI. Then, the project team is assembled to gain approval before proceeding.

Process design 223:

This task involves a series of tasks that helps the enterprise scope out the needed equipment and understand the unit of operation. A series of activities are included under this task including how the enterprise determines the process that the enterprise will use to manufacture the product. The critical document of this sub process is the process design scope. This document is a WORD template that resides in Domino.Doc. The Document at the minimum contains the project objective, process design basis, process description, process flow sheet, and design issues/special considerations/proprietary considerations. An R&D processing developer is responsible for the completion of this document.

Plant tests are executed to determine if the plant is capable of producing the new or changing product. The first task 224 in the process is to reconcile the formula and authorize a test formula. This information is completed on a formula trial clearance. The document resides as a Word document on Domino.Doc. Next, an HACCP plan (U.S. FDA terminology) that defines Hazard Analysis and Critical Control Points associated with the product is completed. This is an extremely important task in the process to ensure consumer food safety where such products are involved. This is a document that resides in a database. Once the preliminary HACCP Plan is complete, a task to determine the preliminary manufacturing procedures begins. Manufacturing procedures are the detailed recipe and units of operation on how the enterprise makes the product (including: required equipment, equipment specifics, ingredients, etc.). A plant trial test request form must be completed to authorize a plant to perform a test. This form is an electronic document completed by R&D product team member and resides on Domino.Doc. The information is routed to the plant(s) and the test(s) are completed, in task 226. Finally all plant tests are reviewed by the assigned project team and the plant results are either accepted or the process stopped in task 228.

Volume forecast 230 and consumer testing 232:

The enterprise can do multiple consumer tests to validate and refine ideas, the corresponding products and key marketing plan elements (e.g., label design, naming, pricing, etc.). These tests are conducted at this juncture to give a forecast on how successful a new product will ultimately perform in the market place. In general, these tests are done when the product, process and package development are nearly complete. The volume forecast in task 230 assesses the size of the opportunity, while consumer use test 232 provides information on consumer purchasing patterns. The analysis of the results of tasks 230 and 232 and the decision on whether to proceed or hold the project is made by the assigned project team. The team prepares a report thereon as a PowerPoint presentation or Word documents. This documentation is posted to the system for storage in the project binder in Domino.Doc, and it is stored there whether or not the project continues.

Engineering 254:

A business initiation checklist is the first critical engineering document. It determines the capital needs of the project and puts scope and parameters around the specific project. The business initiation checklist is a document template that resides in a database in the system. The purpose of the business initiation checklist is to assemble vital business information that assists the business team engineer and engineering management in understanding the business need and determining priority for engineering resources. The business team engineer is responsible for leading the business initiation checklist process. The second engineering process document is the preliminary engineering manual (PEM), which also is a document that resides in a database of the system. The PEM lists all the equipment, construction, and capital needs for the project. The project leader aided by the business team engineer is responsible for completing this process. After the assigned individuals complete the assigned tasks under this engineering task 254, the documentation is available for use in the finalization of specifications task 234.

Package Development 256:

Assigned R&D packaging team members are tasked to identify three packaging categories: primary, secondary and pallet pattern. The actual product is contained in the primary package. The secondary package is the container that holds the primary packages. A pallet pattern is designed based on the secondary package design to ensure efficient transportation of product.

An R&D package team member must task procurement for the material requirements for any internal testing.

Develop Functional Prototypes 258:

Functional prototypes are developed to allow for multiple tests to be conducted on the same package design. The assigned R&D Package team member must request and receive package sample(s) for testing in an R&D plant. Bench top testing is conducted and the prototype is reviewed by the project team for approval.

Development specifications documents also are developed and required to specify dimensions and parameters of needed plant and supply chain tests. The prototype is refined until it is ready for testing.

Develop Preliminary Packaging Costs 260:

The enterprise reviews the preliminary cost of packaging to make sure the enterprise can achieve the anticipated business proposition. The R&D package team member sends the estimated packaging costs to persons in finance assigned to the project, and this process continues until the sides are in agreement on the cost.

In task 262, a physical test plan is developed to determine whether the package can withstand certain physical demands. These tests are conducted with functional prototypes or plant test packaging. This is a physical Word document that may be placed in Domino.Doc.

Issue final package specifications 264:

The finalized family of specifications for the packaging of the product is generated. These documents reside in a designated file folder. These documents also contain the package layout drawings, in addition to specifications. Assigned packaging R&D persons are responsible for providing final specifications information to the assigned packaging specification manager who finalizes all specification types.

Risk Assessment 240:

The project leader reviews the previous risk assessment analysis done in task 129 nearer the end of Phase I, and determines if any new risks arise prior to the completion of the business proposition 208.

The project leader is responsible for routing the Excel spreadsheet risk assessment document to the appropriate team members to revisit the initial risk and provide input. The assigned project team members route any changes back to the assigned project leader. The project leader working with team will then analyze the results and create action plan, in task 242. The summary sheet is attached to the business proposition generated in task 208. The project planning system manages the routing of the Excel spreadsheet electronically. The completed document is stored in the project binder in Domino.Doc.

Complete CAR 216 and Approval 218:

The capital appropriation request (CAR) is the process of gaining approval for capital needed for project specifics (e.g., request for plant construction or equipment). The approval process is based on the level of capital requested. The higher the value the higher the level of approval. The document is completed by assigned persons in operations finance. The assigned project leader presents the request for division approval first and it can be presented in conjunction with the business proposition of task 208. The CAR must be approved by the assigned reviewer in task 218 for the project to continue. The completed CAR documentation (Word .doc document) is stored in the project binder in Domino. Doc.

Business Proposition Approval Gate 210:

The business proposition approval is the stage gate between Phase 2 and Phase 3. During this time all project dimensions are reviewed, there is a confirmation of the specific business market opportunity and there is a decision to proceed to Phase 3 (Execution) The elements of the business proposition include: 1) Executive summary, 2) situation analysis and market opportunity section includes: product, category, competition and technology, 3) Objective, 4), product/concept/positioning description with testing results, 5) consumer product testing results, 6) key marketing strategies/assumptions, 7) manufacturing and distribution plan/assumptions, 8) Financial justification section, 9) key issues/risks tool summary, and 10) strategic plan impact.

A category team tasks marketing finance to complete the document and route it to the project leader. The project leader presents the business proposal document for approval by upper management of the enterprise. The completed and approved documentation is stored in the project binder in Domino.Doc.

All key product and packaging specifications must be completed and approved before the end of Phase II and before reaching phase III, as indicated by gates 245–248. All of the specification documents used in reaching the respective approval/disapproval decisions reside and are managed within a designated document folder. The assigned product and packaging specification manager(s) are responsible for completing the tasks to enter the formula, manufacturing, and labeling specifications used in this decision tree.

Phase III 300—execution of the project:

Phase III involves preparing the product for roll out to the customers. Most of the tasks in Phase III are execution versus decision based. Phase III has many concurrent and parallel paths, which the tool 400 helps to manage.

Execution Engineering 322:

The assigned business team engineer owns, i.e., is responsible for, the execution engineering activities, but most activities are performed by the assigned engineering project manager. The first task is to complete and issue the execution and control manual. This is a WORD template that resides in a database. If any new equipment needs to be purchased a formal request must be sent to purchasing. The formal document resides within the purchasing system. A task is set up to complete the final design and construction documents. This document contains detailed drawings and specification for any customized equipment. For equipment that must be purchased a bid package/RFQ needs to be completed. Contracts are rewarded and the purchase orders are released, in task 324.

Issue remaining specifications 348:

In Phase III, the enterprise must complete and issue the remaining critical specifications and any applicable safety plans. They include: I) the finished goods specification—technical and qualitative guidelines that must be met to ship the product; 2) the final HACCP plan—regulatory food safety document plan; 3) the package purchasing specification and package bill of material; and 4) the unit load specification, i.e., the width, height and depth palletizing information and attached drawing.

Sales Samples 302:

Sales samples are important to expedite the sell-in process and gain market authorization. This process only deals with samples of new/changing products that use existing packaging forms and process. For new/changing products that are using a new package form and process the sales sample process is directed off of first production approval and do not go through these tasks. The major tasks include:

determining what is going to be shipped, e.g., project leader and team planners determine the product criteria for sales samples;
  gathering of field sales estimates for sales samples, i.e., determining the quantity of sales sample by region;
  completing and confirming label artwork for sales samples;
  scheduling of samples for production and order raw materials;
  shipping of sales samples to customers for distribution to field sales.

In addition, for any final label development is completed, approval is needed of the separators printer proofs by the assigned team member and the release of the final separations from the separator to the vendor who will actually print the material.

Finalize volume estimates 326:

It is important that the enterprise lock in a final volume estimate in mid Phase III. If this is not done in a timely fashion or is flawed the enterprise=s cost production model(s), forecasting model(s) and production planning (materials and product) will be inaccurate. This may result in major production ramp-up issues. As a base the volume estimates that were part of the business proposition forecasts made earlier in task 230 are reviewed and amended with any "new" news. The task here is to make sure this is done.

Inventory Strategy and Targets 328:

Once the enterprise has validated the enterprise=s final volume estimates; it now has to plan the inventory strategies and target levels to ensure the servicing of the business during market introduction and roll-out. It is important that the enterprise does not under or over estimate the needed inventory.

Inventory strategy and target risks/gains are next analyzed in task 330. The risk analysis and inventory strategy are Word templates that reside in Domino.Doc. The results are reviewed by the category logistics manager, communicated to the project and category team, and stored in Domino.Doc.

Three task notifications and completions are involved here: (1) develop inventory strategy and targets, (2) analyze and review inventory and category risks, and (3) communicate inventory strategy.

Change Notification 332:

During the execution of the project there is a point when things become finalized that the enterprise needs to begin the notification process of what is new or changing to the enterprise's manufacturing facilities (internal and external) and distribution network. A precursor to this is the administrative setup of all necessary information in both the enterprise's sales master file (SMF) and materials management master file (MMMF). Critical documents in this process include the following: I) The CN-M (Change Notification—Material) which directs/notifies about new or changing materials and 2) The CN-FG (Change Notification—Finished goods, which directs/notifies the organization about new or changing finished goods dimensions. The CN-FG is a key trigger document for the plants to submit their production model, which finalizes the product manufacturing cost. The tasks in this regard include:

The administrative assistant obtains new UPC and UCC numbers from Sale Master Files. The Material Manager and the Administrative assistant will complete and distribute the Change Notification for materials and finished goods. The plant finalizes its production model. The CN-M is integrated as a Domino.Doc form document.

Finalize shipping container 334:

The enterprise handles materials related to shippers (the container the primary consumer labeled packages are placed in) differently than other direct materials. The administrative assistants working with the print engravers exclusively manage this process.

The administrative assistant completes and distributes a CN-M shipper form that resides on the project planning system. This form contains information and attachments concerning: shipper specifications, dimensions, signature lines, quantities needed, tie-out strategies, and so forth. The enterprise can integrate the CN-M shipper as a Domino.Doc template document.

Financials, tasks 336, 338 and 340:

There are a series of activities the enterprise's financial functions must perform to ensure that all financial information concerning the project aligns to a division P&L and reporting mechanisms are activated. A precursor to completing this is the plant's submission of its final production models. Operation finance determines the final product cost. The business unit manager is tasked to work with operation finance to determine the startup expenses and highlight any difference from the business proposition/CAR process, in task 336. Sales planning and forecasting are performed to provide monthly sales/production volume forecasts, in task 338. Marketing Finance finalizes all information for the enterprise's sales standard price list, in task 340.

Co-manufacturing 350:

If the enterprise uses third party companies to manufacture its products, the task here is to confirm that the execution plan has been finalized and validated with the third party and all internal constituents.

Consumer Promotions 306:

In Phase II the enterprise created a consumer promotions, strategy and plan for inclusion in the business proposition. This includes: 1) planning, 2) developing creative ideas with agencies, 3) developing the specific promotion platform and 4) producing/distributing the promotions. For example, the enterprise can summarize this series of activities into two tasks: 1) completing creative development (includes: planning and developing the creatives), in task 306, and 2) completing the execution (includes: developing platform and producing/distributing), in task 308.

Trade Release 304:

In Phase II the enterprise created the trade release plan for inclusion in the business proposition. In Phase III the enterprise finalizes and executes the plan. The plan and execution must address: pricing, distribution goals, the enterprise plus rates, load-in allowances, shelf placement location, planogram(s), key date (sales samples, quarterly meetings, etc.), presentations, sales and trade incentives, and performance measures. This series of tasks is summarized into one task—complete trade release execution.

Advertising and Media 318:

In Phase II the enterprise created the Advertising and media strategy and plan for inclusion in the business proposition. In Phase III the enterprise executes this plan. This includes: 1) developing the creatives, 2) producing the creatives, 3) testing and approving the creatives, 4) final development of the advertisement, 5) casting, 6) production and 7) distribution. This series of tasks is summarized into two tasks: 1) develop creative ideas (includes: developing, producing, testing and approving creative ideas) and 2) complete execution (includes: final development, casting, production and distribution).

Sales Communication 310 and 312:

Prior to market introduction, the enterprise must assemble information that sales will need to ensure the sell-in process is executed correctly. These bulletins are the enterprise promotional announcements. This may include sales bulletins, brochures, product information, point-of-sale material, and so forth. Besides announcing new or changing products; this process is used also for any information sales needs to receive (e.g., upcoming promotions, sales contests, etc.) The process to collect this information starts with a form called "Call for Material," in task 310. After all the necessary information has been collected, cleansed/improved and approved internally the information is sent to a third party vendor, which assembles all division materials and distributes to sales, in task 312.

The "Call for Material Form" resides in the project folder as a document template and is stored in Domino.Doc.

Sell-In 314:

The enterprise's sell-in process is executed by field sales. To make this successful, sales people must have received complete sales samples from the aforementioned sub process or the first production approval sub process. Also, it is important that all necessary information is received from the sales communication sub process. The subprocess includes: scheduling customer appointment, presenting the new or changing product and trade plans, gaining authorization, assisting in on shelving and ensuring first week shipments occur.

Plant Execution tasks 342, 344 and 346:

This concurrent series of tasks including many different elements on what needs to be executed by a plant prior to first production approval. These tasks include: facility construction and equipment installation, engineering start-up and execution, regulatory follow-ups and approvals, staffing, maintenance plans, sanitation plans, operator training and certification, quality plans, plant administrative needs, order direct materials, and so forth. The enterprise preferably includes the most critical tasks, for example: I) install and startup of equipment (task 342), 2) staffing and training of operators (task 344), and 3) ordering and the lead time involved with direct materials (346).

First Production Approval task 352:

First production approval includes stage gates that occur at the point a manufacturing facility is ready to produce and send actual product into the enterprise's distribution network. Two sign-off approvals occur; one at the plant level (task 354), and one at the division level (task 356). At the plant level approval indicates that the plant can produce the product meeting established criteria on an on-going basis. The assigned decision makers here may include the plant business unit manager, assigned plant quality personnel and the project R&D team leader. As part of this approval process all items needing follow-up are listed (punch list) with corresponding person(s) responsible and timing to complete. At the division level, approval of the assigned brand manager, the assigned project leader and division quality meet to confirm that product conforms to all quality and consumer criteria. The system integrates both approval document templates as Domino.Doc form documents.

Resource release task 358:

Resource release 358 is followed by a decision gate 360 that deals with three separate types of resource release. The three types are: 1) The release of technology and engineering resources engaged in helping the plant ramp-up. Preferably, this should be closely related to the completion of the follow-up list generated in the first production approval process; 2) moving the project from growth technology resources to productivity technology resources; and 3) moving resources from marketing new product development to base business marketing. The tasks can include multiple subtasks, such as scheduling a resource release meeting and holding the meeting to complete and approve the resource release document. The system integrates the resource release document as a Domino.Doc form document.

In Market Success Measures 362:

Shortly after the first production approval process, the enterprise can begin to monitor and evaluate the in-market success of the project. It is the category team and project leader responsibility to ensure that the measurement plans are in place and to monitor and act upon issues that need attention. For an individual project this measurement process may extend from a number of months to a year or more. Measurements can be made in at least three major areas: I) business proposition assumption measures, 2) sell-in measures and 3) supply chain measures.

Other features of the inventive project planning method and computer system used to implement it, include the following aspects.

Project Team Members:

Each and every project, regardless of its type, generally has a project leader and an administrative assistant(s) thereto, responsible for the management and completion of the project. The project leader ensures that all of the different functions and team across the enterprise complete what is required for the project, for example, the project leader ensures that all the project team members analyze the risk assessment document for the project.

The remaining members of a project's team will vary depending upon the size and scope of the project. Smaller projects may only require the participation of plant business unit managers and operational finance people while larger projects will include various research and development groups. All these different team members, whether individuals or groups, come into play at different stages of the project.

Project Life Cycle:

A project begins when an idea has conceptualized or solidified. At this time a project leader, who is usually not the idea's originator, begins to use the inventive project planning system to manage the new project. The project's lifecycle will vary depending on the project's type but each project will follow the basic lifecycle outlined below:

Project Verification:

Before starting a project, project leaders use the inventive project planning system's search features to verify that this particular project has not been proposed or worked on before. In one aspect, this is done by key word searching or listing all projects in a Division file room of interest. By downloading an existing or former project(s) of interest, data and results electronically archived from the earlier projects can be reviewed and compared to the content of the newly proposed concept. The search results help project leaders prevent duplicity of work performed. Additionally, project leaders may find related projects with which they can share and collaborate with.

Project Setup:

Project leaders use the project setup form to initiate a project within the inventive project planning system. This form allows the project leader to provide information about the project. Additionally, all required tasks for the project are selected. For each selected task, the project leader identifies the individual or group responsible for the task completion as well as an estimated duration for each task.

The project setup form has a "generate" button which performs several functions. First, it generates all the appropriate task documents for the project. Second, it creates the appropriate binder within Domino.Doc, the storage mechanism in place for the inventive project planning system.

Upon project generation, Domino Workflow, the task and work flow management mechanism of inventive project planning system notifies the project team members who are slated to complete the first task(s) of the project.

Task Completion:

Project Team members use the task form when they have completed an assigned task. The task form allows the team member to indicate the task has been completed. It also allows the member to include any file attachments that need to be stored for the project. Domino Workflow will manage the task sequencing and dependency, and notify the next project team member for whom work is required. Some tasks may be assigned to the project leader or administrative assistant thereof. Notification also may be performed via electronic mail informing that a task is ready to be completed.

Gate Review—Major and Minor Gates:

Each project will have gates, decision points where the project's course is decided by the enterprise's decision-making personnel. Some gates are mandatory for every project. Other gates are relevant depending upon the project's scope and are therefore optional for projects.

The major gate form is used to capture the relevant decision made for a project at each of the major gate check points. The inventive system 400 keeps track of who approves or rejects the gate and attaches any supporting attachments as well.

The minor gates are further defined in the business requirements for the inventive project planning system section of this document. In one aspect, the minor gates come into play only if the project team decides the gates are relevant.

Project Administration and Changes:

Project leaders and administrative assistant(s) have the ability to add or delete tasks, change or modify the duration of assigned tasks, change the assigned team member(s) to a task. These changes and modifications can be made during a project's life cycle. This adds considerable flexibility to the process.

User Authentication:

Users are required to authenticate to the project planning system utilizing Domino security. A user name and password is issued to each valid user of the project planning system. This determines which projects and task users the user will see when accessing the browser.

Application Security:

Application security for the project planning system can be broken down into multiple separate tiers, such as divisional and project security.

Division Security:

In one aspect, users are only permitted to create, edit, and view projects for a project in their respective division. A special group of users, e.g., upper management, are allowed to view all projects across all divisions.

Project Security:

Project leaders and administrative assistants specify project team members when generating a project. Only these specified individuals have access to create, edit, and delete project information. As projects progress along and project membership changes, project leaders and administrative assistants have the ability to add and delete members to the project, thus granting edit access to the project to those members.

Project Number/Code:

The project planning system generates a unique project code, e.g., a unique project code for each project. This project code is sent to the label development system 430 and which stores it in its database.

Interface Mechanism:

To maximize efficiencies, the above-mentioned LEI database 404 is used to communicate between the project planning system and label development support system 430. The concept here is when data (a document) needs to be sent to system 430 from the project planning system, the document is mailed from the project planning system to a system mail-in database. The system 430 support team could then create agents that would pick up the recently arrived document and process it for use within system 430. The converse also applies, viz., when system 430 needs to send a document to the project planning system, it mails the document to the project planning system's mail in database. A scheduled agent will pick up the document and process it as required.

Textual Help and Reference Library 415:

Help documentation also can be made available from within the project planning system 400. A project planning system administrator can use the Help form to produce help documents. Users clicking on a help link are sent to a view of help documents. The help area includes: "How To's", FAQs, Search, and Library.

Document Search:

The project planning system allows users to search for project documents. The search is both a field and text-based search. For example, a user searching for the phrase "macaroni" would enter this phrase in the search field and then press the search button. The project planning system then retrieves all documents with the phrase "macaroni" and list them for the user.

Keywords 413:

The project planning system requires the use of keywords, system data that can change in the future. An example could be the list of the business enterprise's divisions. Rather than hard coding the list within the application, a keyword document can be created that contains the list of divisions. This document's content can then be dynamically retrieved whenever the project planning system is required to present a list of the business enterprise divisions.

Keyword Document Population:

Keyword documents are either created by an individual through the project planning system or the documents are created through an automated interface with a different system, e.g., PMDS.

User Population:

The user population for the project planning system is derived from divisions or other organizational subunits within the enterprise. Preferably, all divisions within the company that may be involved with idea to market development would have access to the project planning system.

The label and packaging development support subsystem 430 now will be described in more detail now in the following discussion with reference to FIGS. 8 and 9A–9N. The label and packaging development subsystem 430 is integrated with projected development system 400. The label and packaging development subsystem 430 also can be used independently of the system 400 by users authorized for that purpose.

The interface of the label and packaging development support subsystem 430 with the rest of the project planning system 400 is done in a tiered approach. Domino Mail in databases can be used as staging places for documents transferring from subsystem 430 to the rest of the project planning system 400. Domino agents executing at both, will pick up and process Notes documents as they arrive at the mail in respective mail-in databases. The agent processing will involve storing the document as well as initiating any appropriate notifications and/or work flow related tasks.

Figure 8:
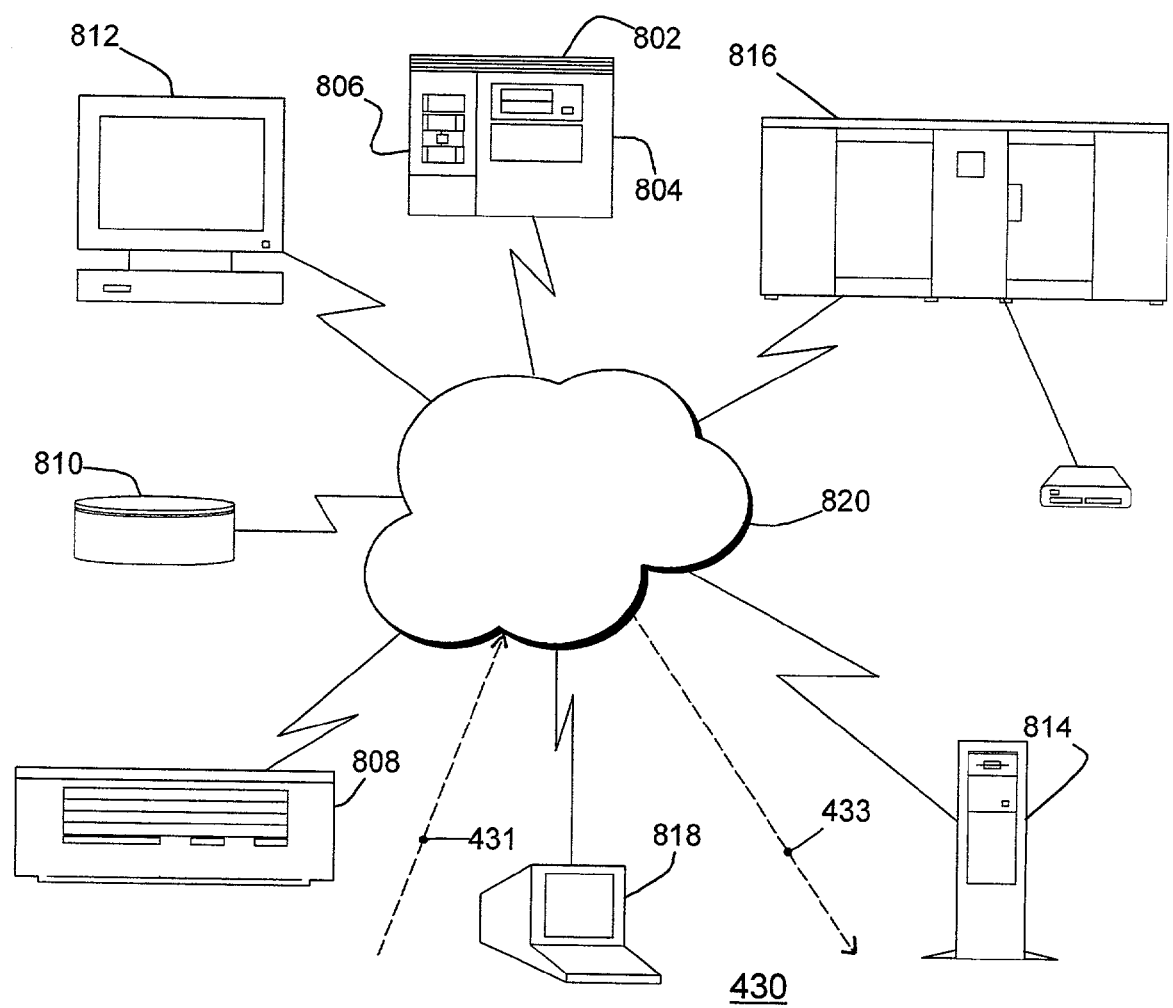
FIG. 8 shows an example of a label and packaging development support system used to assist the management of label and packaging selection aspects of the development of a commercial product according to the invention.

FIG. 8 shows a detailed illustration of the label development support system 430 of FIG. 4. The label and packaging development support system 430 allows users to participate in a uniform packaging process. Forms are made available through the web browser, which provides an information repository for workflow routing. The system is accessed using the Internet browser (e.g., Microsoft Internet Explorer) used to access the overall project management system 400. In more detail, the subsystem 408 includes an Initiation unit 802 providing forms to users at initiation of a product development phase. The Initiation unit 802 includes a Heads-Up unit 804 routing selected forms to product development participants for approval, and, an Agreement unit 806 collecting approved forms and selectively modifying the collected forms. A Folders unit 808 receives forms from the Initiation unit 802 and passes the forms to authorized registered users for editing. A work bin 810 stores all documents including previously edited forms that are identified as belonging to a particular project.

A Visual Catalog 812 automatically maintains and generates thumbnail images of art files available for use in the product development system. Thumbnail images in the Visual Catalog 812 may be metadata searchable. A Scheduling unit 814 assigns target dates to individual tasks that have been entered on forms and tracks completion of previously assigned targets. A Rate Card unit 816 receives pricing information of predefined items from vendors, periodically receives/requests price updates and creates estimates based on received pricing information. A Help Desk 818 provides user support to allow users to communicate with help desk support personnel, e.g., through on-line chat, e-mail, voice communications, etc. It should be noted that although the above described units are shown as individual units connected together over a network 820 such as a local area network (LAN) or over the Internet, multiple units may be aggregated onto one or more large systems, e.g., servers, communicating with each other as appropriate without departing in spirit or scope from the present invention.

To participate in the label development system 430, user systems again may be required to have local copies of document handling software and browser components, such as mentioned above. As with system 400, throughout the product cycle workflow (e.g., packaging approval) for label development, participants can enter, review and approve forms. Workflow events again trigger e-mail notifications to pertinent parties. These email notifications contain uniform resource locator (URL) pointers to the appropriate documents within the system. Most form processing is done at the server level on the server where the particular unit resides using script agents, e.g., the Lotus Script agents from Lotus Corporation. Field validation and data transfer may be done using Java Script, for example, and applets may be included for interface presentation such as for views and action bars. The subsystem 430 is accessible via portal 401, and vice versa, as described elsewhere herein.

The packaging development system 430 may be accessible from inside a local area network or over an intranet, for example, by using a locally recognized URL, e.g., http://kraftcompass.kraft.com or, externally, over the Internet selecting an externally accessible URL, e.g., http://www.kraftcompass.com.

User security may be included such that participants must be authenticated prior to use with Lotus Notes security, for example, from Lotus Corporation. Session authentication may be enabled, using basic Hyper Text Transfer Protocol (HTTP) with enhanced security using cookies, for example. Names and roles of system participants are stored in tables and as views and may be transferred for authentication. Also, user identification (IDs) and password information may be generated automatically and communicated to the appropriate user using e-mail. Only authorized individuals are allowed access to individual documents.

A PLARIS model (Perform, Lead, Approve, Review (FYI only), Input and Support (provide assistance)) defines an access profile indicating whether individuals are working on a particular project, how they are associated with that project and each individual's authority. Users can interact in real time with helpdesk support personnel using on-line chat. Support personnel can also take control over users desktops (after user permission is granted) to troubleshoot problems.

Figure 9A:
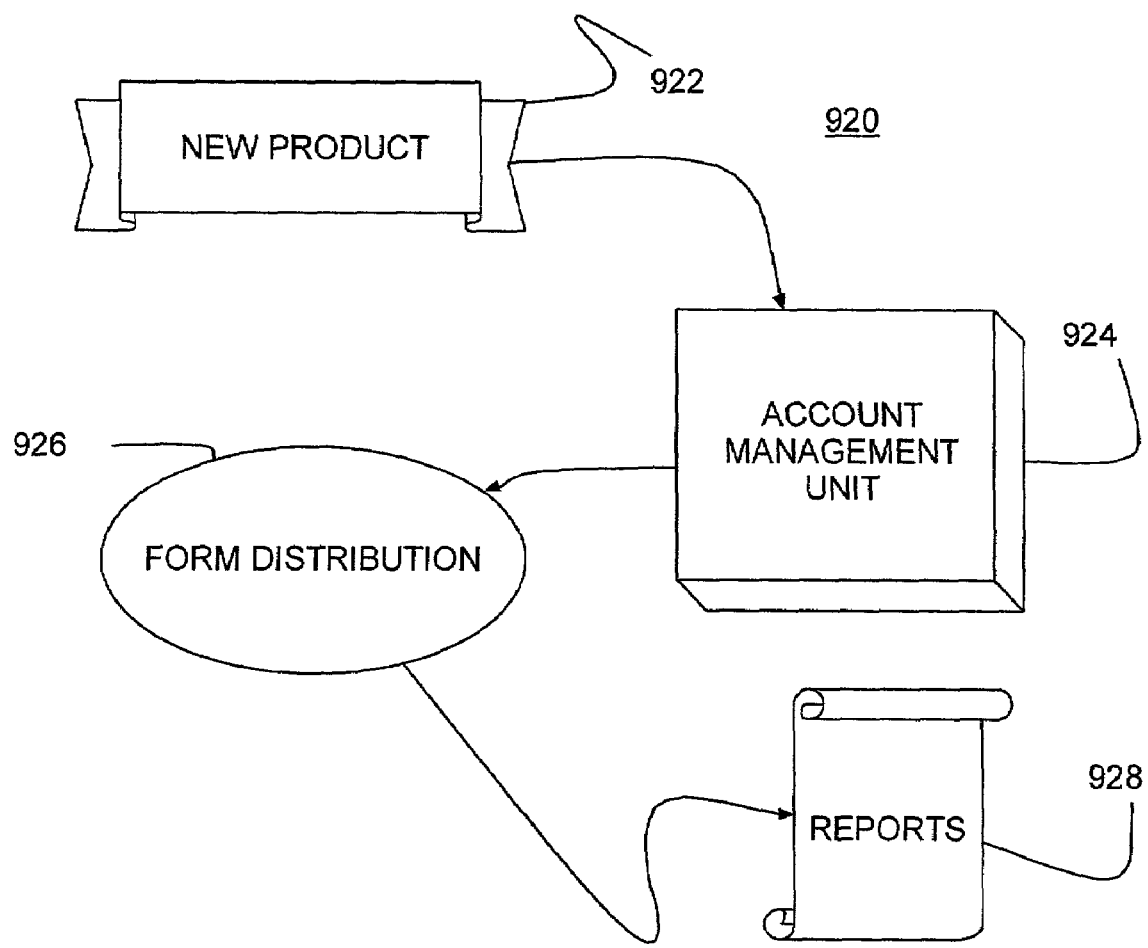
FIGS. 9A–9B show an example of a Heads-Up unit and the high-level workflow for the Heads Up process of the label and packaging development support subsystem of FIG. 8.

FIG. 9A is an example of a Heads-Up unit 920, where each new Heads-Up is created to begin the first phase of the packaging process and, where unrouted projects may be tracked. Heads Up & Agreements are the forms used in the beginning of the packaging process. The Heads-Up unit 920 includes a Product Identification unit 922 that assigns project numbers and related components to each new project. Each request for a Heads-Up must be accompanied by a Project Name, a Project level and any associated Brand(s). An Account Management unit 924 reviews assigned project information. A Review Distribution unit 926 distributes project forms to selected participants for review and approval. Team members may be selected or added during the Heads-Up process. In addition a project description and a business objectives packaging strategy may be provided during the Heads-Up process along with any special team instructions or artwork needs. Participants are given access to review and comment on project forms. A Report Generation unit 928 generates reports from the reviewed information and any associated comments. Participants can enter project data including a targeted "On the Shelf" date. Also, a project leader can be designated by the Heads Up unit 920.

Figure 9B:
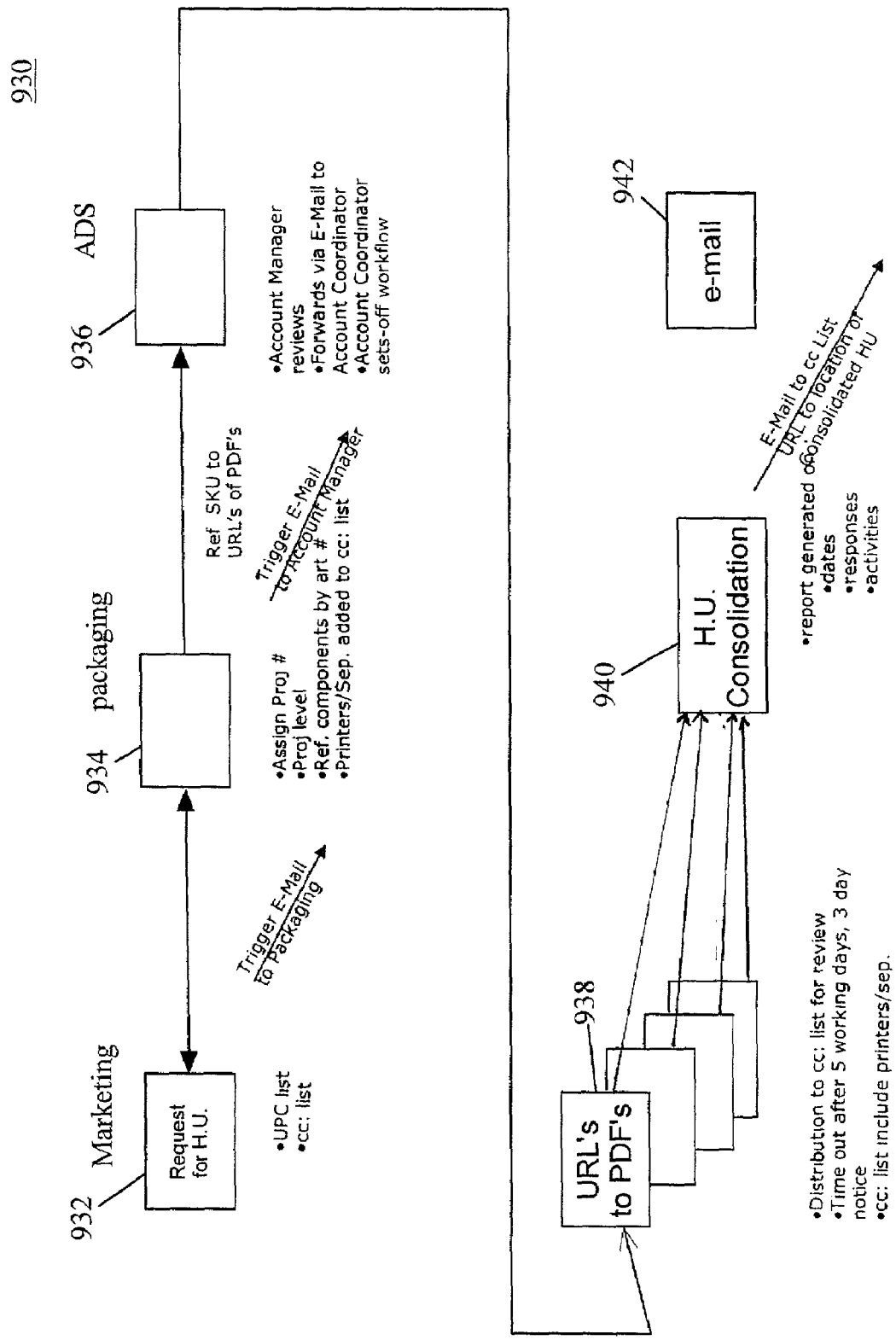

FIG. 9B shows an example of the high-level workflow for the Heads Up process 930 executed by the Heads-Up unit 920. First, in step 932, a Marketing group or module initiates a Heads-Up request which triggers an e-mail to a Packaging group. The e-mail includes a list of products affected, e.g., a list of universal product codes (UPCs), as well as a distribution list. Forms are routed to different participants for approval and comment as part of the workflow. In step 934, the Packaging group assigns a project number and a project level. Also, Heads-Up components for a particular Heads Up are matched with an art number and, thereafter, referenced by that art number. Further, printers and separators are added to the distribution list.

The packaging group triggers an e-mail distribution to the Account Manager, cross referencing related stock keeping unit (SKU) numbers to URLs that each point to product definitions, preferably maintained in PDF format. Proceeding to step 936, the Heads-Up request is passed to an Arts Directors Services (ADS) facilities where the Account Manager reviews the product definitions at the identified URLs. In step 938 the Account Manager forwards the list of URLs to an Account Coordinator, preferably using e-mail and the Account Coordinator initiates the workflow process, distributing the URL list to those on the distribution list for review. Continuing in step 940, after waiting five working days all comments, changes and suggestions are collected and forwarded to a Heads Up consolidation unit which generates a report regarding any proposed dates (e.g., milestones, received responses and proposed activities). In step 942, the report is e-mailed to those listed on the distribution list. Associated graphic files are linked to the forms read only. During the Heads-Up consolidation, reports are organized by Project, Project Leader, etc. and made available on-line as well as with a suitable search engine.

Figure 9C:
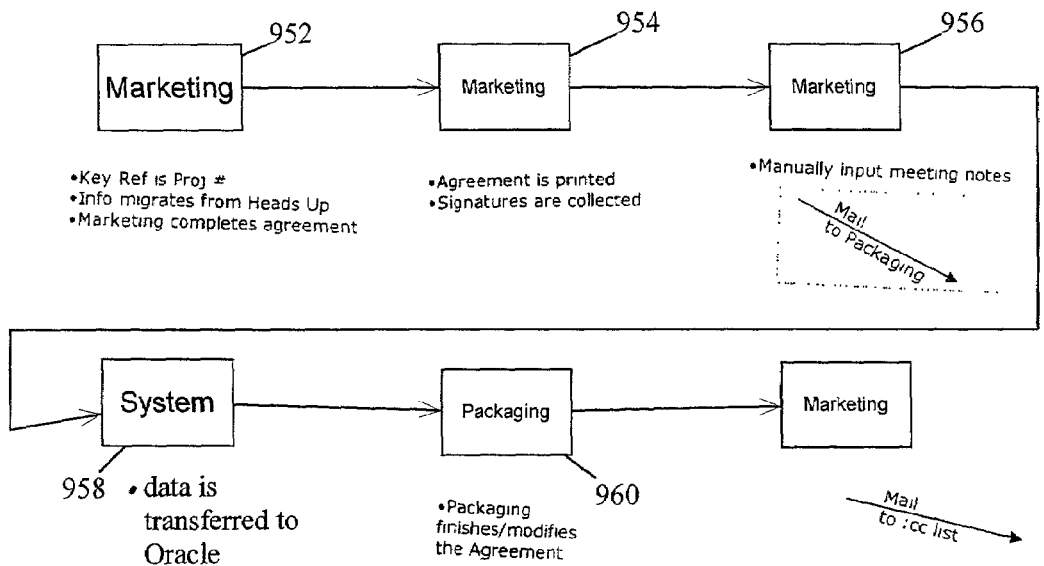
FIG. 9C shows an example of workflow through an Agreement Completion unit of the label and packaging development support subsystem of FIG. 8.

FIG. 9C shows an example of workflow through an Agreement Completion unit 906. The Agreement Completion unit 906 receives information from the Heads Up unit 920 (FIG. 9A) and completes the agreement. First, in step 952 a Marketing unit migrates information for the particular project number received from the Heads Up unit 920. In step 954 a completed agreement is formatted, sent to a printer for printing and then for signatures. Comments are recorded in step 956 and e-mailed to the Packaging group. In step 958, data is transferred to Oracle. The Agreement is modified and completed by the packaging group in step 960. The completed agreement is distributed by an agreement distribution unit as one or more electronic folders (e-folders) to those listed on the distribution list. The completed agreement is distributed to selected participants.

Folders or e-folders are used in a subphase two (2) of the packaging and label development workflow. Two fundamental differences exist between subphase 2 and the first subphase, subphase 1. First, subphase 2 has a more complex workflow and, second, graphic files are no longer read-only. Instead, workflow participants may annotate graphic files. Annotations may be done using the browser with a portable document format (PDF) viewer plug-in such as the PDF Infusion plug-in from ITM Associates, Inc., for example. Annotations may be made using extensible mark up language (XML) and then transmitted to the server. The system summarizes the annotations and generates various reports including reconciliation reports for all annotations from workflow participants. Annotated e-folders are stored in a designated workbin.

The workbin 910 is a system or unit module wherein all documents related to a corresponding user may be collected and accumulated at one single location. The workbin 910 is available from any other module and gives participants quick access to any included document, e.g., for status checks.

Figure 9D:
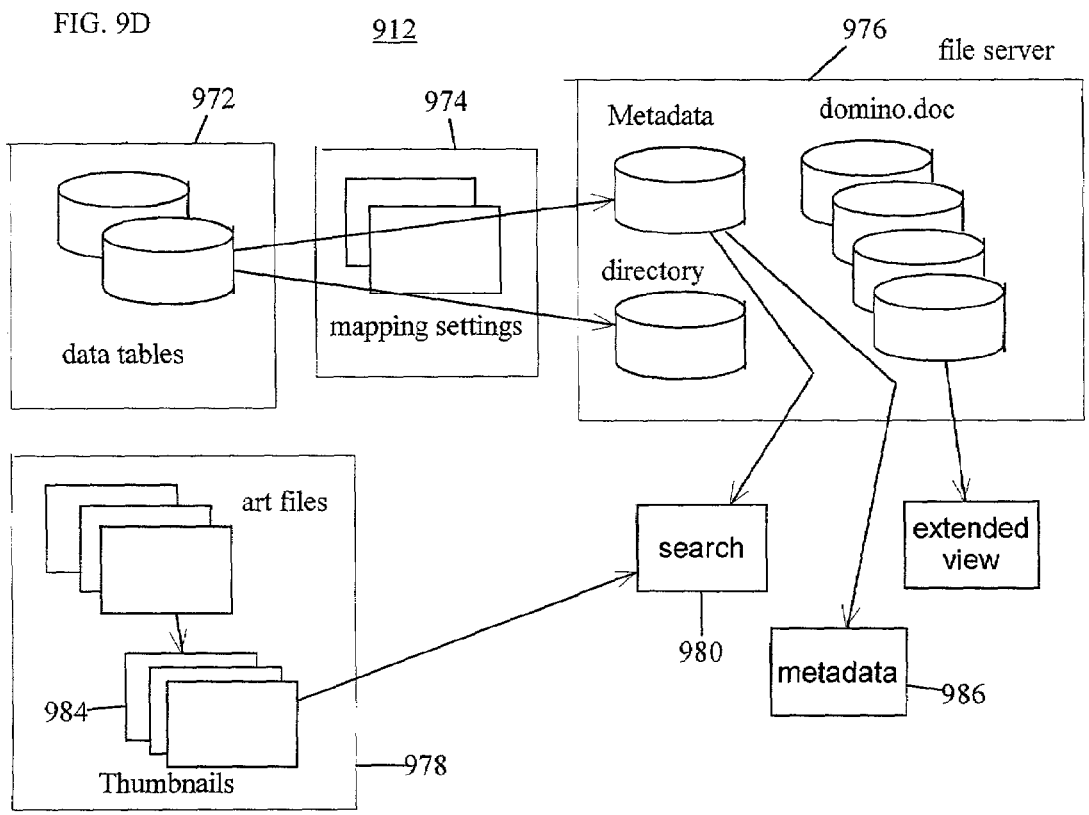
FIG. 9D is a high-level example of a Visual Catalog of the label and packaging development support subsystem of FIG. 8.

FIG. 9D is an example of a high-level depiction of the Visual Catalog 912. The Visual Catalog 912 includes a relational database server 972, where images are stored and maintained. A multi-database integrator 974 such as the Lotus Enterprise Integrator from Lotus Corporation, interfaces the relational database server 972 to a powerful hypertext transport protocol (http) server 976. Art files are converted to thumbnails and cross-referenced thereto automatically for easy identification on a file server 978. Each user is provided access to the http server 976 using a typical state of the art hypertext browser 980. Images 982 are provided in an extended view as well as in thumbnail form 984 and searchable as metadata 986. The Visual Catalog 970 facilitates finding art files located within the system, which once found are displayed on the browser 980, e.g., with a PDF viewer plugin.

Figure 9E:
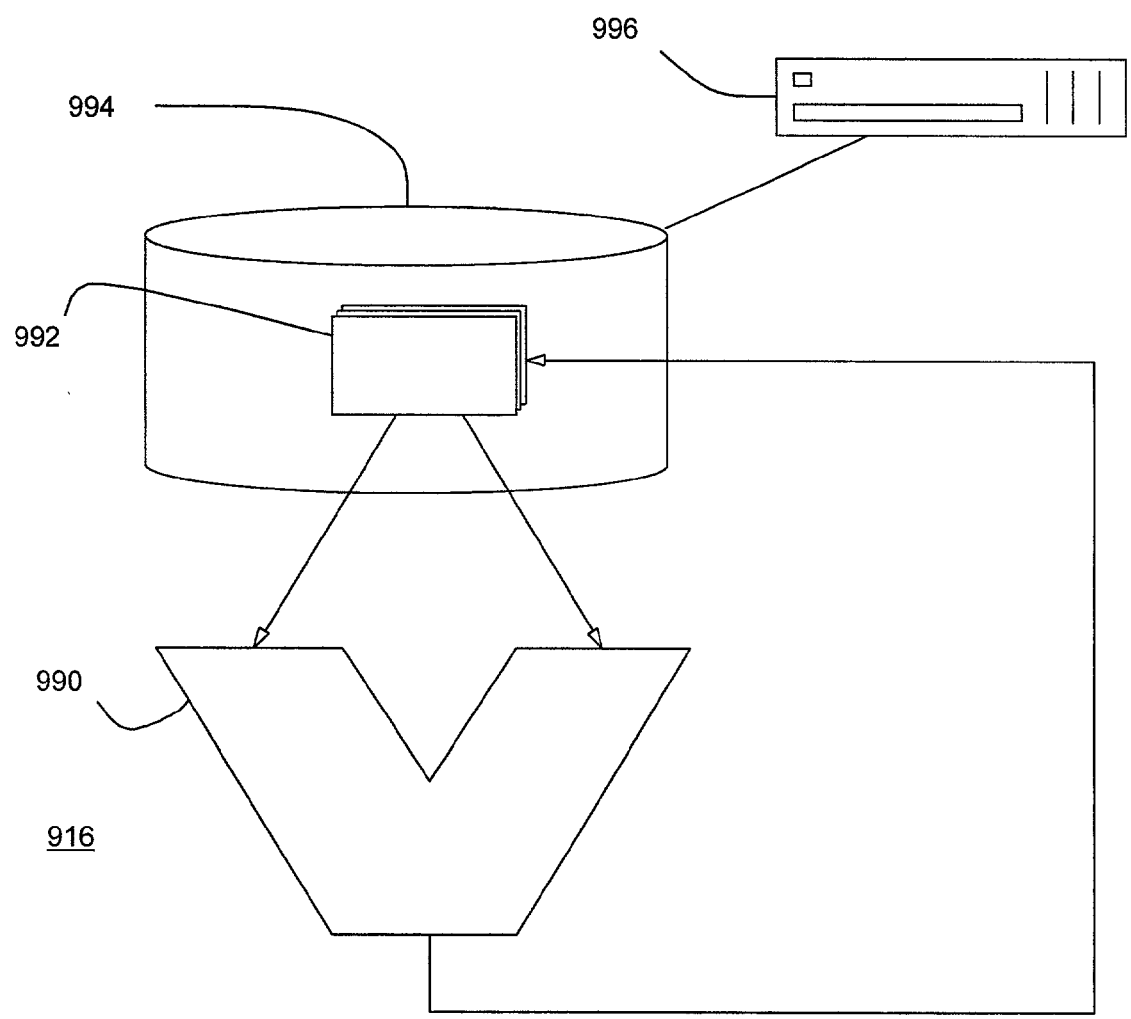
FIG. 9E is an example of a Rate Card unit of the label and packaging development support subsystem of FIG. 8.

FIG. 9E shows an example of a rate card unit 916 which may include a price comparison unit 990 and rate cards 992 stored in a relational database 994. Also, a vendor expenditure tracking unit 996 tracks expenditures related to identified vendors. Vendors to enter pricing information on pre-defined items, create estimates, submit and track invoices and the price comparison unit compares prices in response to pricing information entered onto rate cards 992 by users. Each user may compare estimates and prices, as well as track expenditures by vendor. Rate cards 992 provide users with a unified, centralized source of packaging supply chain information.

The help desk 918 provides advanced real-time communications between users and helpdesk support personnel. Users can request assistance at any time and upon initiating such a request, are placed in a queue until support staff are available. The number of available agents as well as the user's place in the queue is displayed in the browser. Once connected to an agent, the support personnel/agent can chat with the user on-line or, over a phone. When necessary, support personnel may request control over the user's computer. If the user grants permission, helpdesk support personnel can take over the user's machine, remotely detecting and correcting any client-side problems.

Figure 9F:
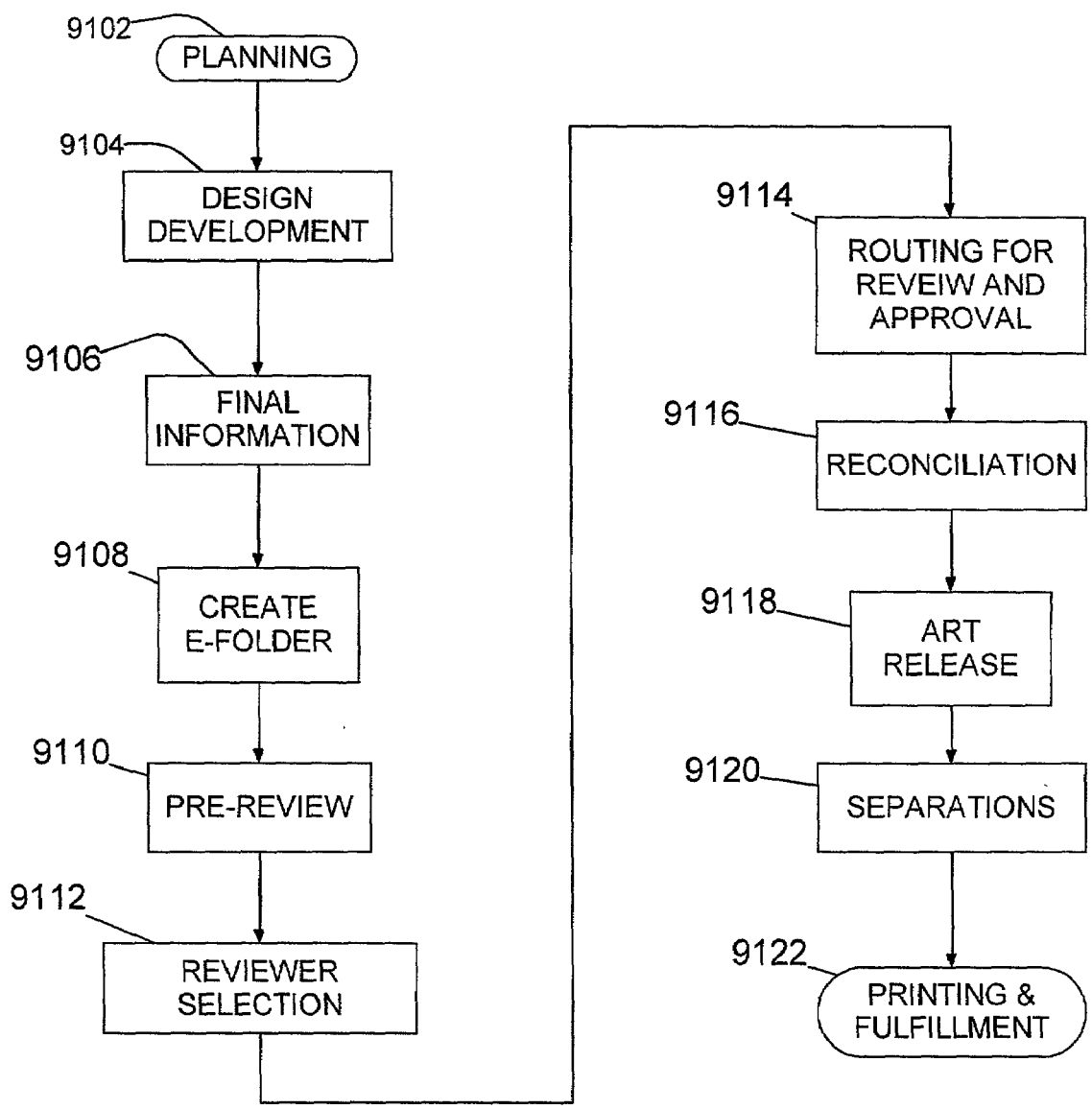
FIG. 9F shows a flow diagram for using the preferred embodiment system of the label and packaging development support subsystem of FIG. 8.
Figure 9G:
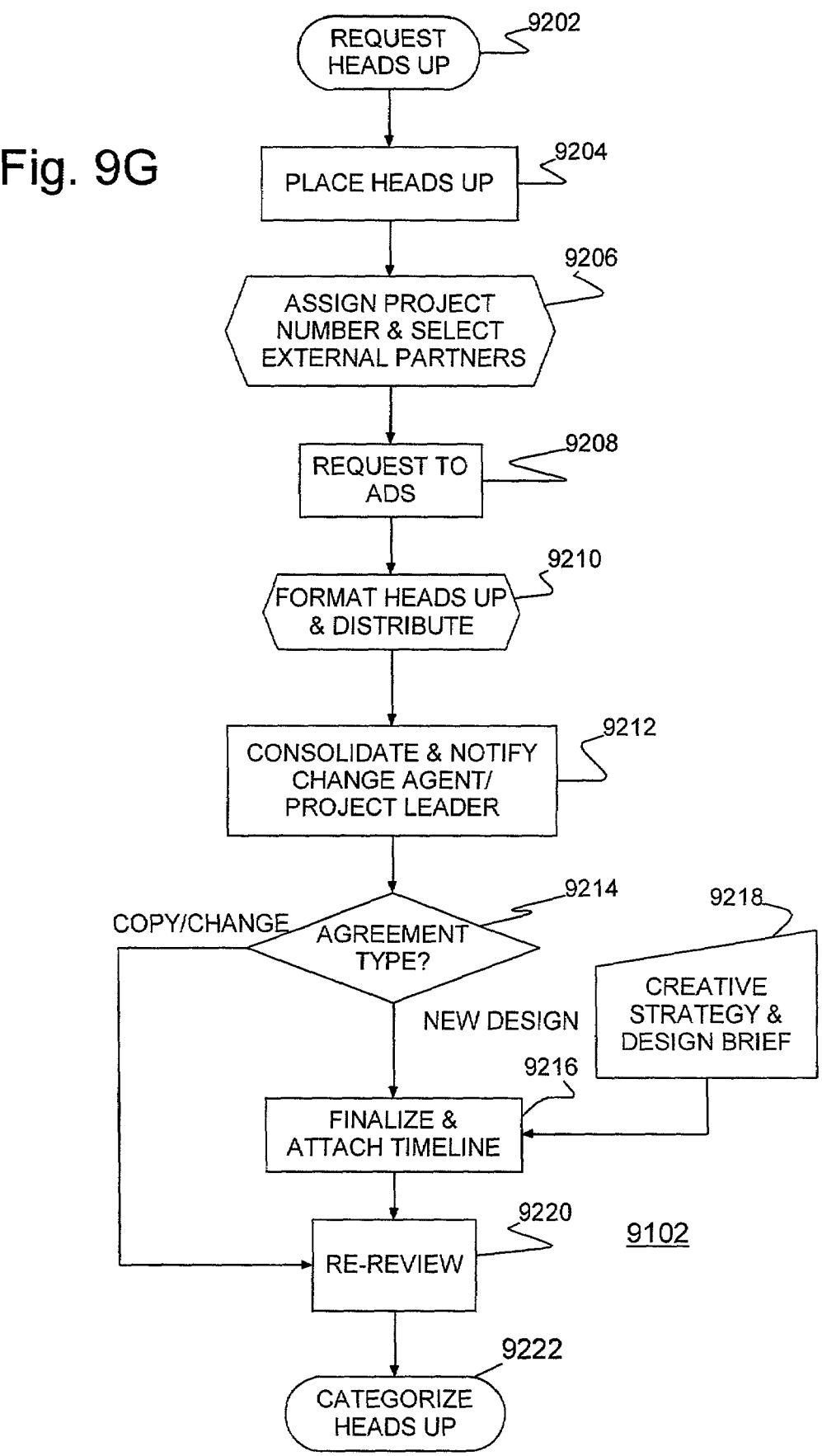
FIGS. 9G–9N are flow diagrams of individual steps shown in FIG. 9F of the label and packaging development support subsystem of FIG. 8.

FIG. 9F shows a flow diagram 9100 for using the preferred embodiment system, which is divided into 11 major steps 9102 to 9122, several of which are further detailed in FIGS. 9GA–9N. FIG. 9G shows the first major step 9102, planning, which begins with a Request for a Heads-Up 9202. The request 9202 is placed by a Change Agent/Project Leader. Next, in step 9204 the Request for Heads Up is passed to Packaging Communications for notification of a pending project. Then, in step 9206 packaging assigns a project number and selects external partners. In step 9208, the Heads Up request is passed to Art Director Service (ADS) where a Heads Up document is created and on the shelf art is added or attached. Then, in step 9210 the document is formatted into a PDF file and the Heads Up PDF is distributed. The extent of distribution depends upon the particular project. A Project Level One (1) is a new product. Project Level Two (2) is redesign/extension of an existing package. A Project Level Three (3) is a copy only. A Project Level Four (4) is a promotions project. In particular, distribution may be to multiple functions for review and approval, such as to packaging managers to kosher review, to label compliance review, to a sales or procurement organization or to a packaging specifications analyst. The particular distribution list depends upon the particular user/product developer organization.

Next, in step 9212 the Heads Up document is consolidated and the Project Leader/Change Agent is notified, preferably by e-mail. Then, in step 9214 the Heads Up Agreement is checked for agreement type, i.e. whether the Agreement is a new design agreement or a much simpler copy/change agreement. If the Agreement is a Design Agreement, then, it is passed to the Change Agent/Project Leader. In step 9216 the Change Agent/Project Leader finalizes the agreement and attaches a project timeline. Simultaneously, in step 9218 a senior design manager provides a creative strategy and completes a design brief section of the Agreement. Then, in step 9220 the Agreement is returned to the same areas that reviewed the initial pass of the Heads Up for re-review by those same areas. If instead of a design agreement, the Agreement is a copy/change agreement, then, in step 9214 it is passed directly to previously selected areas in step 9220. After the second review, in step 9222 the project is categorized as either a design development prototype project or a copy/change only type project.

Figure 9H:
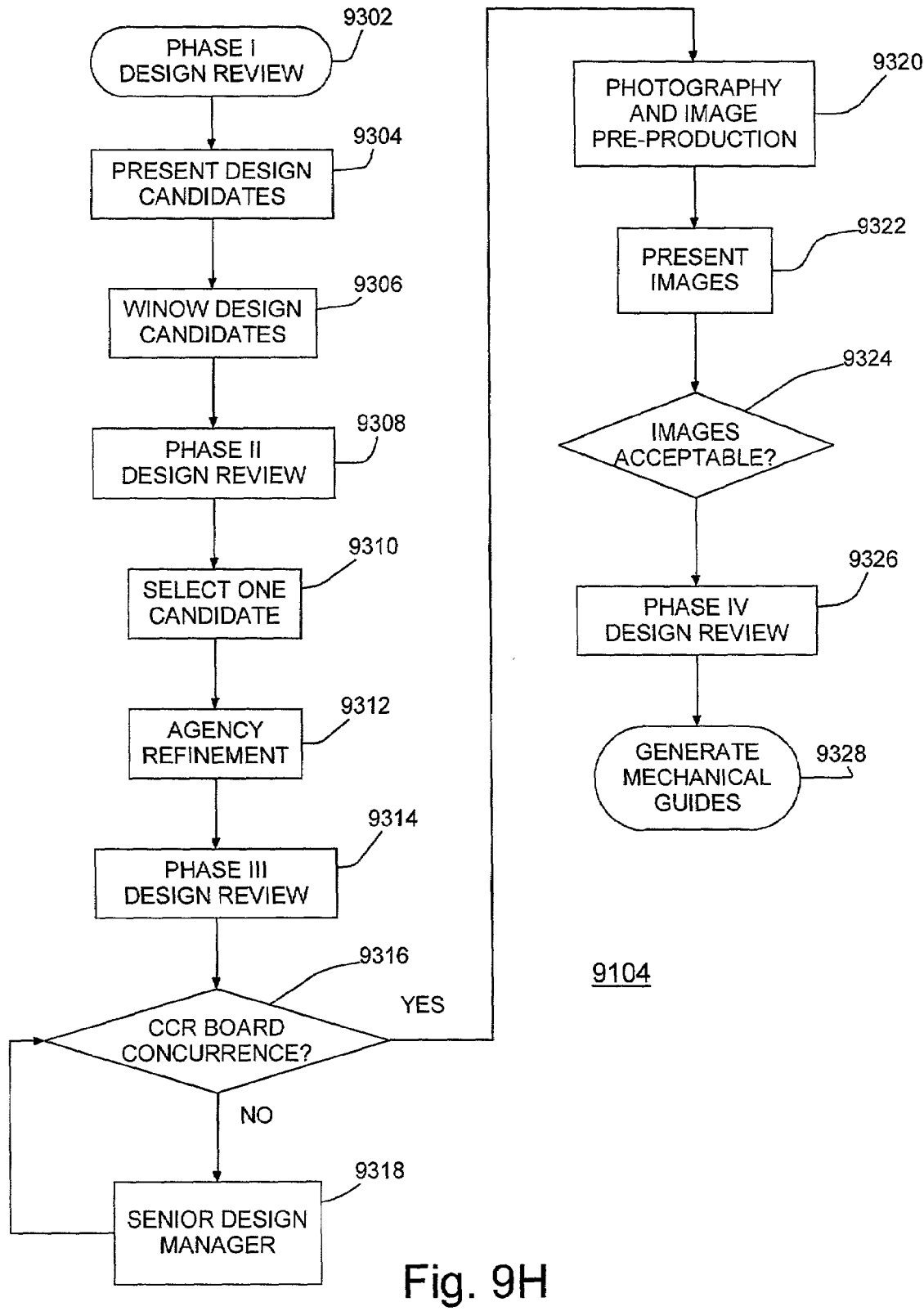

FIG. 9H shows the second major step 9104, which is a design and development step, that begins a design/development type project with a subphase 1 design review in step 9302. Initially, in step 9304, several concepts are presented. In step 9306, a maximum of 2–3 designs are selected for further refinement during the subphase 2 design review in step 9308. An Agency refines selected designs and passes the refined designs for a subphase 2 design review in step 9308. During the subphase 2 design review, one of the remaining 2–3 concepts is selected for refinement in step 9310. All information required for the design is finalized during the subphase 2 review. In step 9312 the final design is passed to an Agency to refine the design. Then, the Agency conducts a subphase 3 design review in step 9314 on the finalized design where the package concept and panel extensions are reviewed. In step 9316 a CCR board reviews the result. If the CCR board does not concur with the final design then, then in step 9318 the design is returned to the senior design manager for further refinement. Once the CCR Board approves the design, it is passed on in step 9320 for photography and image preproduction where digital images are created and captured. In step 9322 the images are numbered and presented at a preproduction meeting. During the preproduction meeting the images are reviewed and if approved, subphase 3 is complete in step 9324. Then, the images are passed on in step 9326 to an Agency for refinement in a subphase 4 design review. Mechanical guides are generated for the final design in step 9328 to complete subphase 4 and the second step 9104. During the period between the subphase 3 review in step 9326 and subphase 4 review in step 9328, when photographs and images are generated and finalized, final information is also required which is also passed on as part of the result out of the second step 9104. It should be noted that generating this final information is a critical milestone. Most projects miss timing goals and require additional resources if final information is not available by the end of the second Step 9104.

For a copy/change only type project step 9104 is omitted. Instead, final information is provided with the copied material and passed on to third step 9106.

Figure 9I:
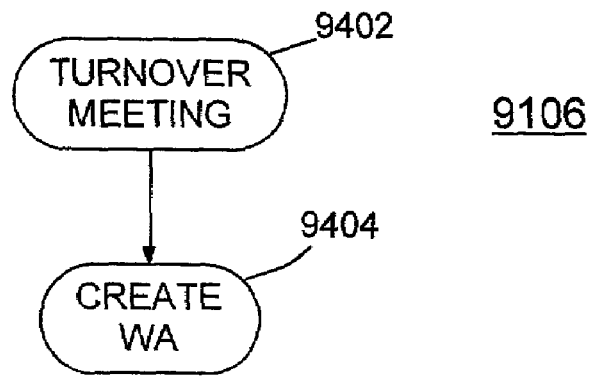
Figure 9J:
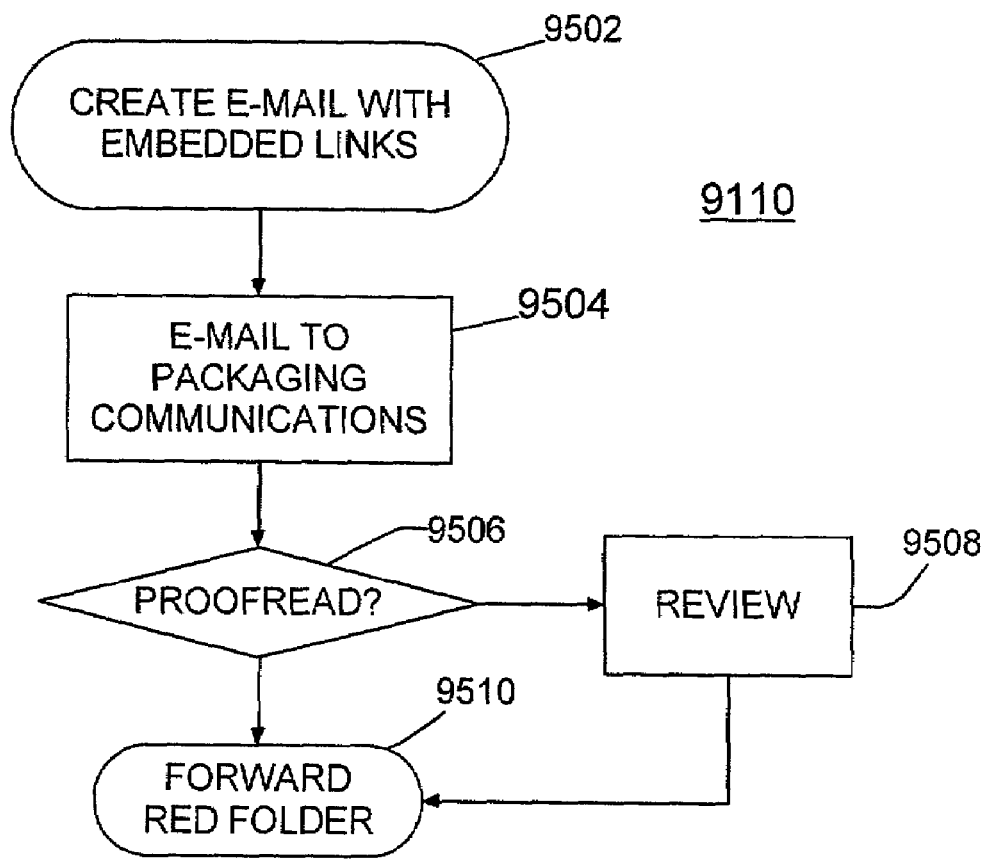

FIG. 9I shows a third major step 9106 which is a final information gathering step that begins with a turnover meeting in step 9402 where the final design and mechanical guides are turned over to appropriate personnel. Packaging Communication creates a work authorization (WA) in step 9404 to begin digital art development. The WA includes all final information for the project (e.g., specifications, ingredients and nutritionals, romance copy, recipe, an indication of current on-the-shelf art and specific instructions for packaging component changes needed).

Next, in the fourth step 9108 e-folders are created. The ADS processes the work authorization, generates resource codes and creates digital art and e-folders. FIF. 9J shows the fifth major step 9110, a pre-review step that requires approximately three business days. In step 9502 the system creates a e-mail message with a hot link to a package approval form stored in the system for a pre-review and, which in step 9504 is sent to Packaging Communications. If necessary, Packaging Communications may forward the e-mail with links in step 9506 to a proofreader for review in step 9508. If the folder is approved, in step 9510 it is forwarded as a red folder to the sixth step 9112; otherwise, it is returned back to Packaging Communication to repeat third step 9106 for regeneration of the work authorization.

Figure 9K:
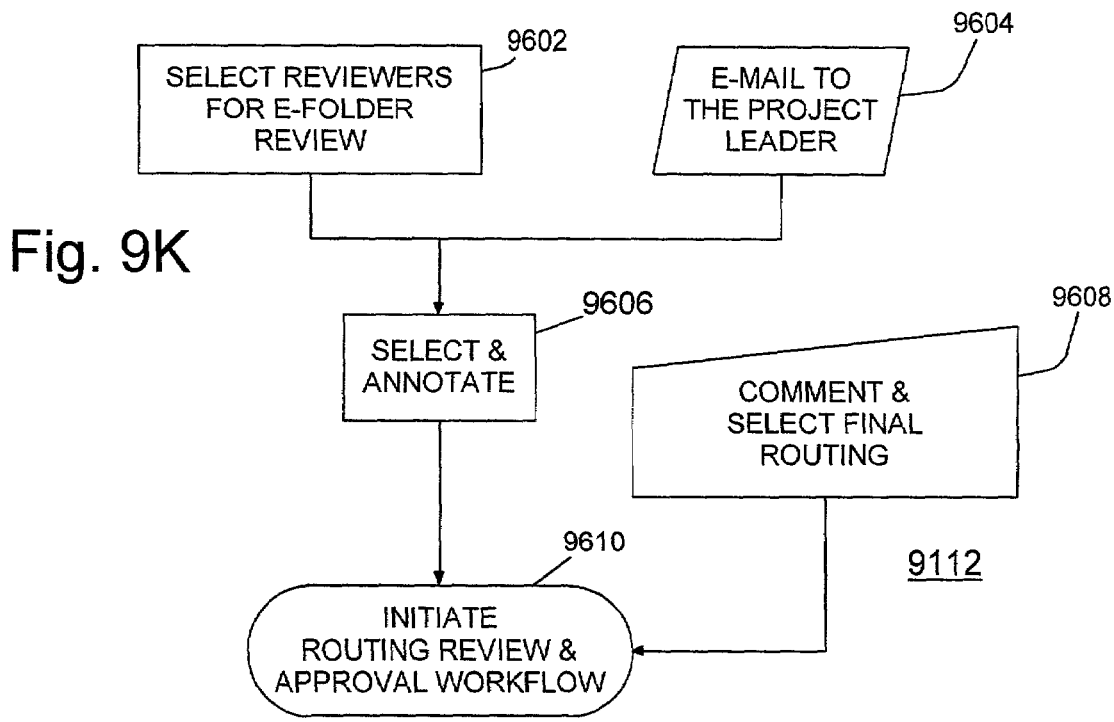

FIG. 9K shows the sixth step 9112 wherein red folders are reviewed. First, reviewers are selected and allowed one business day to review the e-folder in step 9602. First, in step 9604 the project leader receives an e-mail with a hyperlink to an appropriate package approval form. In step 9606 the project leader reviews the PDF files located at the hyperlink and annotates the package as appropriate. In step 9112 the project leader can add any special comments in the comment section and select a final routing to functional participants for review and approval. By default the names of reviewers are those indicated in the Agreement document. The project leader can change names, selecting as few or as many as the project leader deems necessary to review the product changes. Then, in step 9610 the product leader initiates routing review and approval workflow by selecting a submit to team icon.

Figure 9L:
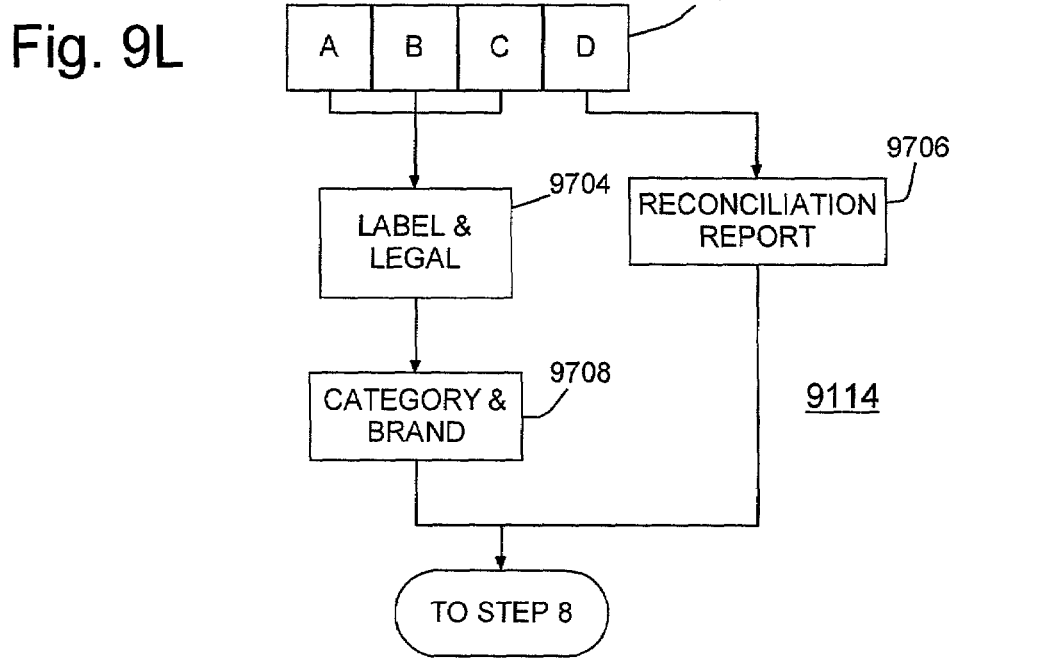

FIG. 9L shows the seventh major step 9114 wherein the package is routed for review. Routing is done in step 9702 concurrently within groups and sequentially between groups. Sequential routing is dependent on each functional area's need to see components from the previous reviewers, i.e., routed to legal in step 9704 after TBM in step 9702. Typically, routing time for each step is determined by minimums (as fast as a group is expected to review and approve) and maximums (the maximum time permitted for each functional group, based on their resources). The established maximum time for any group is the longest any group is allowed. Formally, for prior project review methods, packages remained in each group until a group member decided to forward it manually. It should be noted that the project leader can route projects as fast as participants can be encouraged to sign, which is not substantially different than the prior art paper based approval system.

Initially, in step 9702 there are appropriate reviewers types A–D, and so forth, such as reviewers types A, B and C involved with reviewing the materials against the original hard copy documentation who may then approve the material; a liaison for an activity notification only; design managers who reviews and approve the material if found satisfactory; promotions department for review of promotional project who may select appropriate promotion resources for review and approval; review persons having authority to approve packages for project levels 1, 2 or 4 only; and reviewers type D including packaging quality, separators and printers, who can review and, if satisfied, approve the project; and so forth. Once approved, the project is passed on for inclusion in a reconciliation report in step 9706.

By contrast, approved packages from reviewer group types A, B and C are passed to a second tier of reviewers, group 2, in step 9704. Group 2 could include label compliance and legal persons. Once approved by group 2, the package is passed to a third tier of reviewers, group 3, in step 9708 for concurrent routing to a category business manager and a brand manager. Once approved by Group 3 the seventh step 9114 is complete.

Figure 9M:
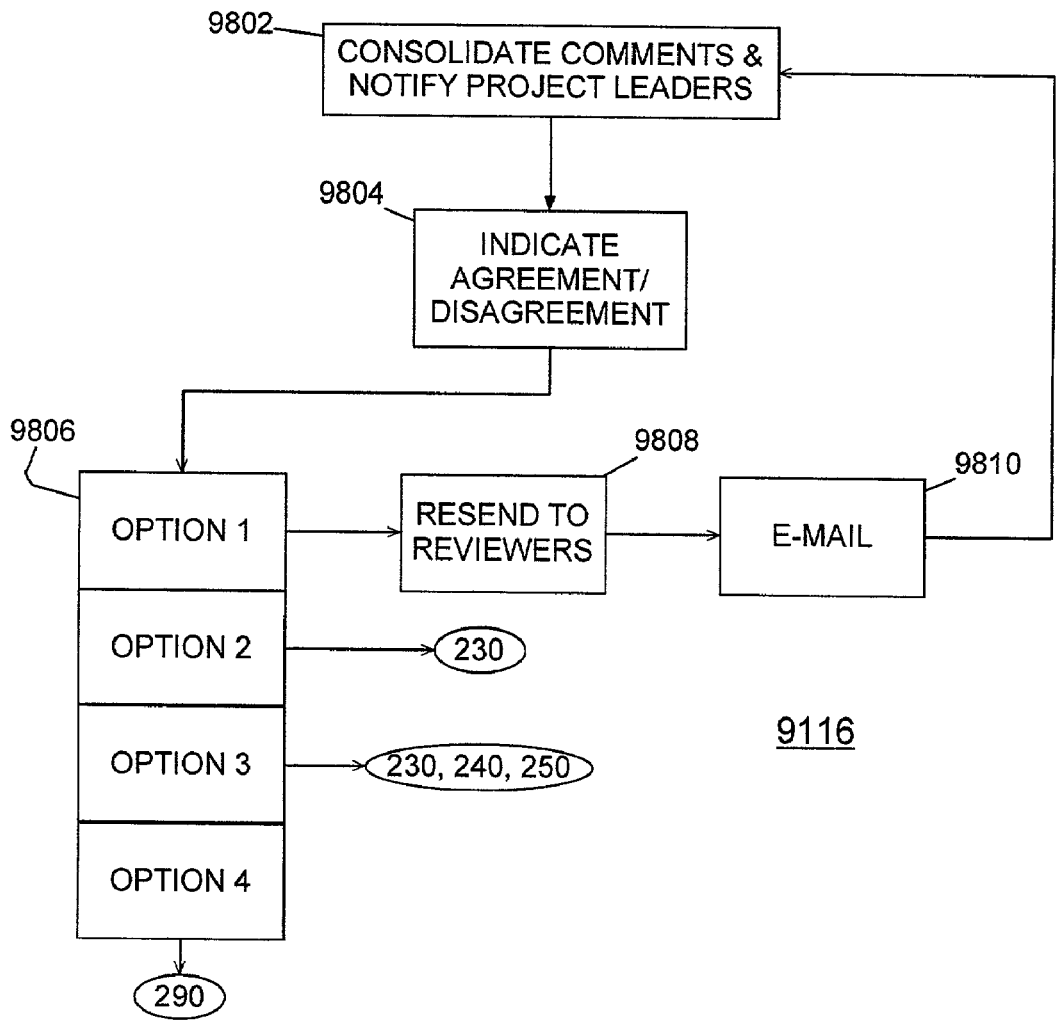
Figure 9N:
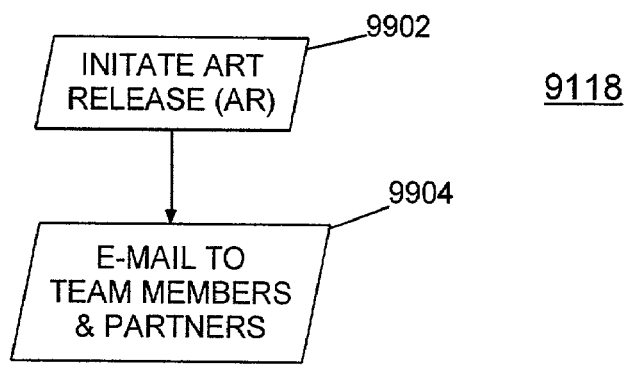

FIG. 9M shows the eighth major step 9116 wherein any outstanding issues are reconciled. In step 9802 after routing has been completed, comments are consolidated and project leaders are notified by e-mail. The e-mail notification message contains a link to the reconciliation form. In step 9804 the project leader is required to indicate with a check mark agreement or disagreement with comments. After approval and reconciliation by the project leader, the project leader in step 9806 is directed to the package approval page and provided with four options, selection of which depends upon the state of the package. The first option allows the project leader to resend the folders in step 9808 to reviewers that previously failed to review or, merely did not review the package during the initial routing or non-reviewers. In step 9810 an e-mail sent to each of the non-reviewers. After comments have been received from the non-reviewers, outstanding issues are again reconciled in step 9802. If Option 2 is selected, the project leader can request corrections to the folder based on team comments and reroute the folder to re-execute third major step 9106. It should be noted that if anyone selects a "must re-review option" in the initial routing, this reroute second option is automatically initiated. Option 3 is selected only if minor corrections are needed, corrections minor enough to not require further review (i.e., a rerouting for a minor change) then the project leader can indicate completion of the change and request an Art Release (AR). Then, returning, major steps 9106, 9108 and 9110 are re-executed for Packaging Communication review. When no corrections are needed, the fourth option is selected and processing continues to the ninth major step 9118 where an art release (AR) is requested.

FIG. 9M shows the ninth major step 9118, an Art Release step, which requires at most three business days. Packaging Communication receives an email notification from the system and initiates the art release in step 9902. Art release e-mails are sent in step 9904 to functional team members and any external partners. The art release e-mail contains links to final approved digital art. It should be noted that at the end of third major step 9106, code resources may be generated and passed directly to the art release step 9118. Tenth major step 9120 is a separations step. Final major step 9122 is printing and fulfillment step which requires two to six business weeks. Upon completion of final step 9122 the commercial package subprocedure is complete.

The flexible project management tool of the present invention may include a stop feature that provides a designated project leader or liaison with the ability to change a project in mid-routing. When this stop feature is exercised, the system automatically notifies recipients that the project stopping. A forward feature may be included to provide the project leader or liaison with authority to forward a package approval document to another team or to a back up person for review and approval within an existing routing. A skip-by-project-leader feature may be included to allow a project leader/liaison to skip a previously selected reviewer. This skip-by-project-leader feature may be particularly useful if a reviewer is selected in error and, therefore, no review is needed from that reviewer's functional area. If this skip-by-project-leader feature is exercised an e-mail will be sent to both the person being skipped and to somebody else for notification.

The present invention may be embodied in a computer program contained in a computer-readable carrier such as solid state memory, magnetic disk, optical disk, radio frequency carrier wave, audio frequency carrier wave, or infrared beam.

While the invention has been described in terms of preferred embodiments, those skilled in the art will recognize that the invention can be practiced with modification within the spirit and scope of the appended claims.

What is claimed is:

1. A computer-implemented project development system, comprising:
 a computer coupled for inter-communication to a plurality of stations from which respective users each have a browser-based interface with the computer, wherein the computer includes:
 project idea managing software operational when executed by a processor to direct the processor to perform the following tasks:
 receive idea information describing a proposed new project;
 store information in a database on the proposed new project;
 search for information on previous proposed projects stored in a database based on an inputted search request by a user;
 evaluate the proposed new project using criteria including the search results for information on previously proposed projects to generate an evaluation document; and
 a graphical user interface providing contextual help for users displayed as pop-up or scroll in thumbnail windows appearing on the user's display screen when a user moves a cursor arrow and rests it on a button or heading in the screen.

2. The computer-implemented project development system of claim 1, wherein the information is stored in an electronic file form that is key-word searchable and retrievable.

3. The computer-implemented project development system of claim 1, wherein the information is stored in an electronic file form under categories of business that are key-word searchable and retrievable.

4. The computer-implemented project development system of claim 1, further comprising authenticating means for differentiating between external users and internal users, and controlling access of a given user to system resources based on the authenticating data supplied by the user when logging on.

5. The computer-implemented project development system of claim 1, further comprising cookie means for developing a user profile of users and maintaining user activity information on the system.

6. The computer-implemented project development system of claim 1, further comprising means for built-in e-mail functionality capability using internet e-mail in which e-mail documents can be separately sent or received by a user without the user needing to back out of the current screen being viewed.

7. The computer-implemented project development system of claim 1, further comprising means for permitting a user to select a name(s) of desired team members for recipients of e-mail in a window without having to scroll out of a screen to send the e-mail.

8. The computer-implemented project development system of claim 1, further comprising means for displaying project reports as printable browser-based documents.

9. The computer-implemented project development system of claim 1, further comprising means displaying customized display screens for managerial review providing overview information for projects underway on the system.

10. A computer-implemented project development system, comprising:
a computer coupled for inter-communication to a plurality of stations from which respective users each have a browser-based interface with the computer, wherein the computer includes:
project idea managing software operational when executed by a processor to direct the processor to perform the following tasks:
receive idea information describing a proposed new project;
store information in a database on the proposed new project;
search for information on previous proposed projects stored in a database based on an inputted search request by a user, and
evaluate the proposed new project using criteria including the search results for information on previously proposed projects to generate an evaluation document;
receive technical feasibility information and process the technical feasibility information to generate a technical feasibility document;
receive risk assessment information and process the risk assessment information to generate a risk assessment document;
receive information on projected project timelines for tasks required to reach market introduction;
receive information on task assignments to personnel and associated timelines for completing them;
generate a product proposal plan upon receiving at least portion of the idea evaluation information, technical feasibility information, risk assessment information, and projected timelines for the tasks required to reach market introduction information;
receive information on the acceptance or non-acceptance of the product proposal plan;
business planning software operational when executed by the processor to direct the processor to receive business planning information and process the business planning information to generate a business proposition and a capital allocation request, and to receive and process information on the acceptance or non-acceptance of the business proposition and the capital allocation request;
project launching software operational when executed by the processor to direct the processor to receive overall finalized product information and process the finalized product information, and to receive and process information on the acceptance or non-acceptance of the product launch; and
a graphical user interface providing contextual help for users displayed as pop-up or scroll in thumbnail windows appearing on the user's display screen when a user moves a cursor arrow and rests it on a button or heading in the screen.

11. The system of claim 10, wherein the project idea managing software is operational to direct the processor to further perform, between the tasks of receiving the technical feasibility and risk assessment information, a task of receiving and processing consumer feedback information obtained via surveying potential customers on the concept of the proposed project.

12. The system of claim 10, wherein the project idea managing software is operational to direct the processor to further perform, between the tasks of receiving the technical feasibility and risk assessment information, a task of receiving and processing input forecast of potential volume of said new project.

13. The system of claim 10, wherein the business planning software is operational to direct the processor to further perform a task of receiving and processing consumer testing information on product prototypes associated with the new project.

14. The system of claim 10, wherein the project launching software is operational to direct the processor to further perform a task of receiving and processing customer authorization information for product market introduction.

15. The system of claim 10, wherein the project launching software is operational to direct the processor to further perform tasks of receiving and processing initial product information, and to receive and process information on the acceptance or non-acceptance of the initial product information.

16. The system of claim 10, wherein the project launching software is operational to direct the processor to further perform tasks of receiving and processing resource release information to generate a resource release document, and to receive and process information on the acceptance or non-acceptance of the resource release.

17. The system of claim 10, wherein at least one of the work stations comprises a desktop computer, a laptop computer, a computer terminal, or an Internet appliance.

18. The system of claim 10, further including a database including memory storing identification, task assignment, scheduling and outcome information on previously proposed projects and newly proposed projects, wherein said database is associated with a web server, and the browser-enabled stations being operable to communicate a request to the server to access said project information, and the server being operable, upon receipt of the request, to retrieve and pass the requested information to station to be displayed by the browser.

19. The system of claim 10, including browser software residing on the stations, and said computer including a web server through which users enter a web home page or portal for the system upon sending a system URL via HTTP to the web server.

20. The system of claim 10, further comprising task control software operational to permit an administrator of the project to make additions, changes or deletions in the task assignments during implementation of a project on the system.

21. The system of claim 10, further comprising task control software operational to permit an administrator of the project to make changes in timelines associated with task assignments during implementation of a project on the system.

22. The system of claim 10, further comprising task control software operational to permit an administrator of the project to select from among optional task assignments during the receiving of the information on task assignments.

23. The system of claim 10, further comprising task control software operational to permit an administrator of the project to add task assignments after the receiving of the information on task assignments and during implementation of a project on the system.

24. The system of claim 10, further comprising document storing and retrieval software for maintaining documents generated during project development which are applicable to given tasks.

25. The system of claim 10, further comprising document storing and retrieval software for maintaining document templates applicable to tasks.

26. The system of claim 10, further comprising project information generating software for displaying task information and timelines on a browser-enabled user station for a selected project.

27. The system of claim 10, further comprising project information generating software for displaying task information and timelines on a browser-enabled user station for a selected project, further including electronic mail software providing an interface with electronic mail associated with the selected project.

28. A computer-readable medium having computer-readable instructions for performing a method of operating an automated computer based product development system comprising a web server in inter-communication with browser-enabled user stations, the method comprising:
   receiving idea information describing a proposed new project into the computer;
   storing information in a database on the proposed new project into the computer;
   electronically searching for information on previous proposed projects stored in a database based on an inputted search request by a user;
   evaluating the proposed new project based upon a comparison of the search results for information retrieved on previously proposed projects with the newly proposed project;
   receiving technical feasibility information into the computer;
   processing the technical feasibility information to generate a technical feasibility document;
   receiving risk assessment information into the computer;
   processing the risk assessment information to generate a risk assessment document;
   receiving information on projected project timelines for tasks required to reach market introduction into the computer;
   receiving information on task assignments for personnel and associated timelines for completing them;
   processing at least a portion of the idea evaluation information, technical feasibility information, risk assessment information, and projected timelines for tasks required to reach market introduction information to generate a product proposal plan;
   receiving information into the computer on the acceptance or non-acceptance of the product proposal plan;
   routing the product proposal plan via the computer to a product label and packaging development support subsystem, if the product proposal is accepted, for packaging label development;
   receiving product label information into the computer from the label and packaging development support subsystem;
   receiving business planning information, if the product proposal plan is accepted, into the computer;
   processing the business planning information to generate a business proposition and a capital allocation request;
   receiving information into the computer on the acceptance or non-acceptance of the business proposition and the capital allocation request;
   receiving product launch information, if the business proposition, and capital allocation request are approved, into the computer;
   processing the product launch information to generate a (i) request for plant level approval indicating whether a plant designated to produce the product can produce a product meeting criteria established thereof or in the product proposal plan, and (ii) a request for release of resources comprising tasking the scheduling, completing and approving of a resource release document relating to release of resources for production of the product, and the resource release document being integrated into the system; and
   receiving information into the computer on the approval or disapproval of the request for plant level approval, and the request for resource release approval.

29. The method of claim 28, wherein said evaluating step further comprises assigning at least one person responsible for conducting the comparison of the electronic search results for information retrieved on previously proposed projects with the newly proposed project, and receiving information into the computer indicating whether the proposed new project is accepted or not-accepted based on said comparison.

30. The method of claim 28, further comprising, between the steps of processing the technical feasibility information and receiving risk assessment information into the computer, receiving and processing consumer feedback information obtained via surveying potential customers on the concept of the proposed project.

31. The method of claim 28, further comprising, between the steps of processing the technical feasibility information and receiving risk assessment into the computer, receiving and processing input forecast of potential volume of said new project.

32. The method of claim 28, wherein said receiving of business information into the computer includes receiving information on product prototypes associated with the new project.

33. The method of claim 28, wherein said receiving of product launching information includes receiving customer authorization information for product market introduction.

34. The method of claim 28, wherein said receiving idea information describing a proposed new project into the computer includes assigning a unique project identifier thereto.

35. The method of claim 28, further comprising, after the receiving of information on task assignments and associated timelines for completing them, receiving information from an administrator of the project making additions, changes or deletions in the task assignments during implementation of a project on the system.

36. The method of claim 28, further comprising, after the receiving of information on task assignments and associated timelines for completing them, receiving information from an administrator of the project making changes in the timelines associated with task assignments during implementation of a project on the system.

37. The method of claim 28, further comprising sending electronic mail to personnel regarding the status of the task assignments during project development.

38. A method for automating a project development system, comprising:
   planning a plurality of project development phases for said project development, wherein said project development phases are capable of being displayed on display units of a plurality of browser-based clients of a computer system, and said clients each comprising a browser operable to communicate with a server which can retrieve stored information on previously submitted projects from computer database and pass the retrieved information to the display unit of the client from which the request was made;

providing, for each of said project development phases, a set of task requirements necessary to complete each respective project development phase;

providing for each task requirement a means for determining the completion status of that requirement;

providing means for indicating the completion of each task requirement on the display unit;

providing a graphical user interface providing contextual help for users displayed as pop-up or scroll in thumbnail windows appearing on the user's display screen when a user moves a cursor arrow and rests it on a button or heading in the screen;

providing means for electronically messaging persons responsible for said tasks;

providing gate means after each development phase which is in an open or closed state insofar as permitting the project to progress through the respective gate means, wherein each gate means is opened only when all the requirements for the given project development phase have been completed.

39. The method of claim 38, further comprising means to approve access and access levels of users to the computer.

40. The method of claim 38, further comprising means for changing the task requirements during project development.

41. The computer-implemented project development system of claim 1, further comprising a label and packaging development support subsystem permitting users to participate in a uniform label and packaging development process.

42. The system of claim 10, further comprising label and packaging development support managing software operational to permit users to participate in a uniform label and packaging development process.

43. A computer-implemented project development system, comprising:

a computer coupled for inter-communication to a plurality of stations from which respective users each have a browser-based interface with the computer, wherein the computer includes:

project idea managing software operational when executed by a processor to direct the processor to perform the following tasks:

receive idea information describing a proposed new project;

store information in a database on the proposed new project;

search for information on previous proposed projects stored in a database based on an inputted search request by a user;

evaluate the proposed new project using criteria including the search results for information on previously proposed projects to generate an evaluation document; and selecting means for permitting a user to select one or more names of desired team members for recipients of e-mail in a window by selectively checking boxes next to displayed names of the team members without having to scroll out of a screen to send the e-mail.

* * * * *

UNITED STATES PATENT AND TRADEMARK OFFICE
CERTIFICATE OF CORRECTION

PATENT NO. : 7,051,036 B2  Page 1 of 1
APPLICATION NO. : 09/998892
DATED : May 23, 2006
INVENTOR(S) : Rosnow et al.

It is certified that error appears in the above-identified patent and that said Letters Patent is hereby corrected as shown below:

-On Title Page, under (Abstract), line 9, delete "intercommunication" and insert -- inter-communication --.

-In column 40, line 7, claim 28, delete "thereof or" and insert -- therefor --.

Signed and Sealed this

Twenty-eighth Day of November, 2006

JON W. DUDAS
*Director of the United States Patent and Trademark Office*